United States Patent
Strauss et al.

(10) Patent No.: US 9,981,382 B1
(45) Date of Patent: May 29, 2018

(54) SUPPORT STAND TO REORIENT THE GRASP OF AN OBJECT BY A ROBOT

(71) Applicant: X Development LLC, Mountain View, CA (US)

(72) Inventors: Marc Strauss, Fremont, CA (US); David Youmans, San Francisco, CA (US)

(73) Assignee: X Development LLC, Mountain View, CA (US)

(*) Notice: Subject to any disclaimer, the term of this patent is extended or adjusted under 35 U.S.C. 154(b) by 90 days.

(21) Appl. No.: 15/172,766

(22) Filed: Jun. 3, 2016

(51) Int. Cl.
*B25J 9/00* (2006.01)
*B25J 9/16* (2006.01)

(52) U.S. Cl.
CPC .......... *B25J 9/1666* (2013.01); *B25J 9/1697* (2013.01)

(58) Field of Classification Search
CPC ...... B25J 9/0093; B25J 9/0097; B25J 9/1697; B25J 9/1687; B25J 9/1669; B25J 15/009; B25J 15/0023; B25J 15/106; B25J 9/1666; B65G 47/905; B65G 47/80; B65G 47/74; B65G 47/82; B65G 47/84; G05B 2219/39508; G05B 2219/39509; G05B 2219/39511; G05B 2219/39517; G05B 2219/39537; G05B 2219/39538; G05B 2219/40053; G05B 2219/40583; G05B 2219/45063; B23P 19/001; B23P 19/002; B23P 19/006; B23P 19/007; B23P 19/00; H01L 21/68
See application file for complete search history.

(56) References Cited

U.S. PATENT DOCUMENTS

| | | | |
|---|---|---|---|
| 8,534,728 B1 * | 9/2013 | Bosscher | B25J 15/10 269/266 |
| 9,120,230 B2 | 9/2015 | Lipson et al. | |
| 9,130,485 B2 | 9/2015 | Prahlad et al. | |
| 2011/0222995 A1 * | 9/2011 | Irie | B25J 9/1687 414/225.01 |
| 2012/0053728 A1 | 3/2012 | Theodorus et al. | |
| 2013/0085604 A1 * | 4/2013 | Irie | B25J 9/1687 700/258 |
| 2015/0037131 A1 | 2/2015 | Gritman et al. | |
| 2015/0336271 A1 * | 11/2015 | Spicer | B25J 9/1697 428/195.1 |
| 2017/0088355 A1 * | 3/2017 | Khodl | B65G 1/1375 |

* cited by examiner

*Primary Examiner* — Adam R Mott
(74) *Attorney, Agent, or Firm* — McDonnell Boehnen Hulbert & Berghoff LLP

(57) ABSTRACT

An example system includes a robotic device having a robotic manipulator and a support stand. The support stand may receive an object placed thereon in a given orientation and maintain the given orientation. The robotic manipulator may pick up an object in a first orientation with respect to the robotic manipulator and determine a target pose for the object. Based on the determined target pose, a control system may determine to reorient the object with respect to the robotic manipulator using the support stand. The robotic manipulator may place the object on the support stand in a particular orientation and pick up the object, disposed on the support stand in the particular orientation, in a second orientation with respect to the robotic manipulator. While the object is held in the second orientation with respect to the robotic manipulator, the robotic device may move the object to the target pose.

20 Claims, 11 Drawing Sheets

US 9,981,382 B1

SUPPORT STAND TO REORIENT THE GRASP OF AN OBJECT BY A ROBOT

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, component design and assembly, as well as control system design.

Robotic devices may include various components or attachments that are designed to aid the robotic device in interacting with the environment and performing various operations. Such components may include robotic hands, feet, and various other robotic manipulators and end effectors and means of movement.

SUMMARY

A robotic device may include a manipulator for picking up, holding, and moving objects. A support stand may receive objects placed thereon in a specific orientation and may maintain the specific orientation of the objects placed thereon as the objects are disposed on the support stand. The support stand may be within an area of reach of the robotic manipulator so as to be accessible to the robotic manipulator. The robotic device may use the support stand to reorient objects that the robotic device is operating on. The robotic manipulator may be used to pick up an object in a first orientation and determine a target pose (target position and target orientation) for the object. The first orientation may be a first orientation of the object with respect to the robotic manipulator (e.g., a first manner of holding the object). A control system of the robotic device may determine to reorient the object with respect to the robotic manipulator by using the support stand. Reorienting the object may involve placing the object on the support stand in a particular orientation and picking up the object, disposed on the support stand in the particular orientation, in a second orientation. The second orientation may be a second orientation of the object with respect to the robotic manipulator (e.g., a second manner of holding the object). The robotic manipulator may move the object to the target pose while the object is held in the second orientation.

In an example embodiment, a system is provided that includes a robotic device and a robotic manipulator. The system also includes a support stand configured to receive an object placed thereon in a given orientation and maintain the given orientation of the object placed thereon. The system additionally includes a control system configured to cause the robotic manipulator to pick up an object in a first orientation with respect to the robotic manipulator. The control system is also configured to determine a target pose for the object and, based on the determined target pose for the object, determine to reorient the object with respect to the robotic manipulator using the support stand. The control system is additionally configured to cause the robotic manipulator to place the object on the support stand in a particular orientation. The control system is further configured to cause the robotic manipulator to pick up the object, disposed on the support stand in the particular orientation, in a second orientation with respect to the robotic manipulator. The control system is yet further configured to cause the robotic manipulator to move the object to the target pose while the object is held in the second orientation with respect to robotic manipulator.

In another example, a method is provided including causing a robotic manipulator of a robotic device to pick up an object in a first orientation with respect to the robotic manipulator. The method also includes determining a target pose for the object and, based on the determined target pose for the object, determining to reorient the object with respect to the robotic manipulator using a support stand. The support stand is configured to receive an object placed thereon in a given orientation and maintain the given orientation of the object placed thereon. The method additionally includes causing the robotic manipulator to place the object on the support stand in a particular orientation. The method further includes causing the robotic manipulator to pick up the object, disposed on the support stand in the particular orientation, in a second orientation with respect to the robotic manipulator. The method yet further includes causing the robotic manipulator to move the object to the target pose while the object is held in the second orientation with respect to the robotic manipulator.

In an additional example, a non-transitory computer readable medium is provided having stored thereon instructions that, when executed by a computing device, cause the computing device to perform operations. The operations include causing a robotic manipulator of a robotic device to pick up an object in a first orientation with respect to the robotic manipulator. The operations also include determining a target pose for the object and, based on the determined target pose for the object, determining to reorient the object with respect to the robotic manipulator using a support stand. The support stand is configured to receive an object placed thereon in a given orientation and maintain the given orientation of the object placed thereon. The operations additionally include causing the robotic manipulator to place the object on the support stand in a particular orientation. The operations further include causing the robotic manipulator to pick up the object, disposed on the support stand in the particular orientation, in a second orientation with respect to the robotic manipulator. The operations yet further include causing the robotic manipulator to move the object to the target pose while the object is held in the second orientation with respect to the robotic manipulator.

In a further example, a system is provided that includes means for causing a robotic manipulator of a robotic device to pick up an object in a first orientation with respect to the robotic manipulator. The system also includes means for determining a target pose for the object. The system additionally includes means for determining, based on the determined target pose for the object, to reorient the object with respect to the robotic manipulator using a support means. The support means is configured to receive an object placed thereon in a given orientation and maintain the given orientation of the object placed thereon. The system additionally includes means for causing the robotic manipulator to place the object on the support means in a particular orientation. The system further includes means for causing the robotic manipulator to pick up the object, disposed on the support stand in the particular orientation, in a second orientation with respect to the robotic manipulator. The system yet further includes means for causing the robotic manipulator to move the object to the target pose while the object is held in the second orientation with respect to the robotic manipulator.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
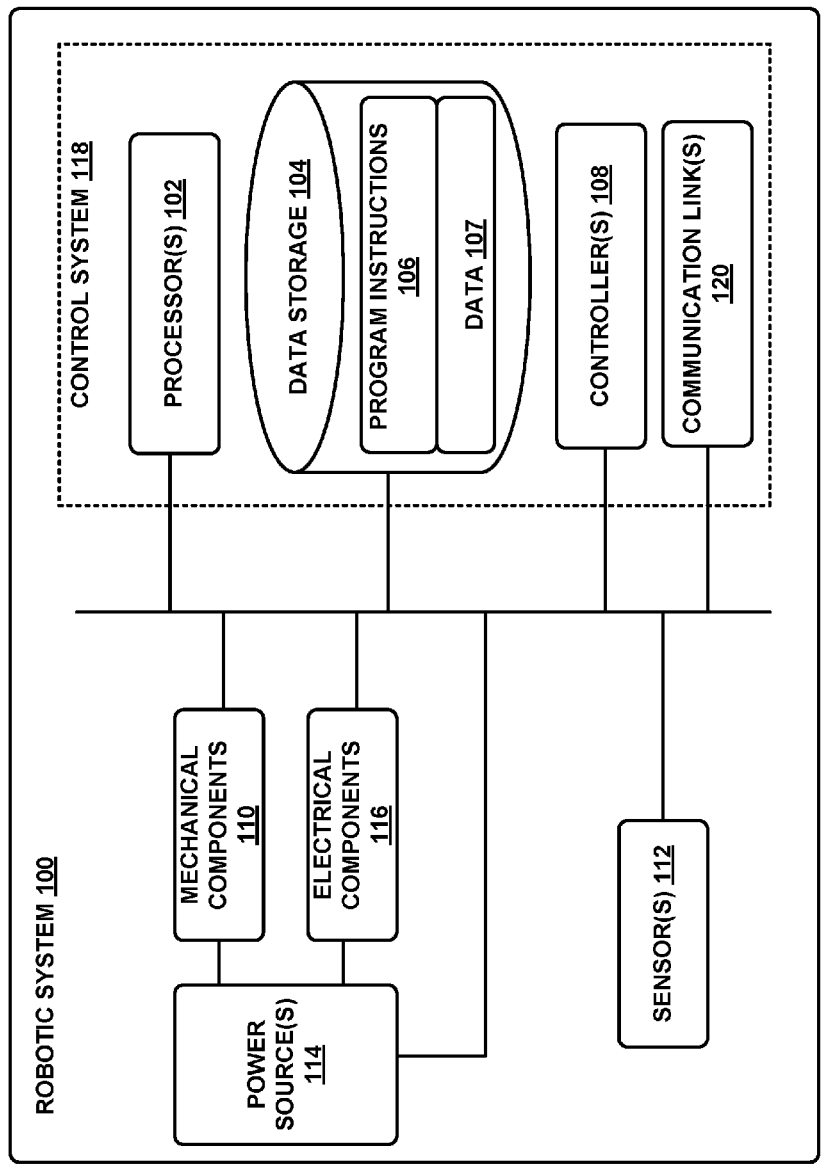
FIG. 1 illustrates a block diagram of a robotic system, according to an example embodiment.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that aspects of the present disclosure, as generally described herein and illustrated in the figures, can be arranged, substituted, combined, separated, and designed in a wide variety of different configurations, all of which are contemplated herein.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. OVERVIEW

Robotic manipulators and end effectors may be used in many situations to allow a robotic device to interact with an environment by pushing, pulling, grasping, holding, or otherwise interacting with one or more objects in the environment. For instance, a robotic device may include a robotic gripper having one or more fingers that can be actuated to change the shape of the robotic gripper, thereby allowing the robotic gripper to interact with the environment.

In many situations, robotic manipulators and end effectors may be positioned to grasp an object by a physical feature of the object. For example, a pinch gripper may be positioned to grasp a cup by a handle of the cup. The robotic device and control system thereof, as described herein, may be configured to initially grasp the object in a first orientation or manner by grasping a first physical/geometric feature of the object. The first orientation may be a specific orientation between the object and the robotic manipulator while the robotic manipulator holds the object. For example, the first orientation may involve using the robotic manipulator to grip a lip of the cup in order to pick up and move the cup.

A control system of the robotic device may be configured to determine a target pose for the object. A target pose may include a target (e.g., drop-off) location for the object and a target orientation in which to place the object at the target location. In the example of the cup, the control system may determine that the cup is dirty and needs to be placed into a dishwasher in an upside-down orientation to allow the dishwasher to properly wash the inside surface of the cup.

The control system may also be configured to attempt to place the object in the target pose. Attempting to place the object in the target pose may include planning a trajectory for moving the object to the target location and target orientation of the target pose before physically moving the cup along the planned trajectory. The attempt to place the object in the target pose may include planning the trajectory and following the planned trajectory. In response to or based on attempting to place the object in the target pose, the robotic device may determine that the first orientation between the object and the robotic manipulator (e.g., the first manner of holding the object) prevents placement of the object in the target pose.

For example, the cup may need to be placed upside-down but may be held by the robotic manipulator by a lip of the cup. Thus, the robotic manipulator and/or the robotic arm may interfere with placement of the cup in the upside down orientation. Specifically, the pose of the robot dictated by the target pose of the object may cause an interference of the robot with the environment or with itself. The pose of the robot dictated by the target pose of the object may be characterized by a specific positioning and/or orientation of the robotic limbs, members, links, manipulators, and/or end effectors needed to move the object to the target pose. For example, the robotic device might be unable to place the cup on a dishwasher rack when the cup is held by a lip of the cup because the robotic manipulator may interfere with the dishwasher rack. Alternatively or additionally, the robotic arm may interfere with another part of the robotic device (e.g., self-collision) or another object in the environment (e.g., a door of the dishwasher, another object already disposed on the dishwasher rack, etc.)

In another example, a range of motion of the robotic device and/or robotic manipulator may prevent the robotic manipulator from placing the cup at the target location and in the target orientation of the target pose. For example, when holding the cup by the lip, the orienting the cup upside-down may dictate a pose of the robot that the robot may physically be unable to reach due to range of motion limits of joints of the robotic device as a whole.

The control system may be further configured to determine that, in order to place the object in the target pose, the robotic manipulator of the robotic device may need to grasp or pick up the object in a second orientation or manner different from the first orientation or manner. The second orientation or manner may include grasping a second physical/geometric feature of the object different from the first geometric/physical feature of the object. For example, in order to place the cup in the dishwasher oriented upside-down, the robotic manipulator of the robotic device may need to grasp the cup by the handle.

In order to reorient the object from the first orientation to the second orientation, the robotic device may use a support stand. The support stand may be configured to maintain an orientation of objects placed thereon. Thus, the cup may be picked up by the robotic manipulator in the first orientation (e.g., by the lip of the cup) and rotated to a specific orientation before being placed on the support stand in the specific orientation. The support stand may maintain the specific orientation of the cup while the robotic device repositions the robotic manipulator to pick up the cup in the second orientation (e.g., by the handle).

The specific orientation in which the object is placed on the support stand may be determined by the robotic device based on the target pose of the object, a planned trajectory for moving the object to the target pose, a range of motion limit of the robotic device and any robotic manipulators and/or end effectors thereof, and/or a collision analysis, along the planned trajectory, between the robotic device and the environment and/or the robotic device and itself. For example, it may be determined that, in order to place the cup in the dishwasher upside-down, the robotic manipulator may need to grasp a lower portion of the handle. However, with the cup standing flat on a surface, a thickness of the robotic manipulator and/or end effectors thereof may prevent the robotic manipulator from grasping the lower portion of the handle. Thus, the particular orientation in which the cup is placed on the support stand may involve the cup being tilted to the side to expose the lower portion of the handle for the robotic manipulator to grasp.

In some examples, the robotic device may, before picking up the object, determine that, in order to move the object to the target pose, the object may need to be picked up in the second orientation. However, an initial positioning and/or orientation of the object may prevent the robotic manipulator from grasping the object in the second orientation or manner (e.g., grasping the second physical/geometric feature of the object). In the example of the cup, the cup may be located amongst a number of other cups, resulting in the handle of the cup being obscured, covered, or otherwise blocked by the other cups. Attempting to grasp the handle may result in the robotic manipulator of the robotic device disturbing, tipping, or otherwise damaging the other cups.

In another example, the control system may be configured to determine that a range of motion of the robotic manipulator and/or the robotic device as a whole, prevents the robotic manipulator from initially grasping the object in the second orientation or manner.

Accordingly, the robotic device and control system thereof may be configured to initially grasp the object in the first orientation or manner by grasping a first physical/geometric feature of the object. For example, the first orientation may involve using the robotic manipulator to grip a lip of the cup in order to pick up and move the cup out from amongst the plurality of other cups. The second orientation may involve using the robotic manipulator to grip the handle of the cup in order to move the cup to the target pose.

In one example, the object operated on by the robotic manipulator of the robotic device may be a key used to open a lock. For example, the robotic device may be an exploration robot configured to move through the rooms of a building. The robot may have a key or a set of keys to use to open and close doors as the robot moves from room to room. In order to place the key in the lock, the robotic device may need to grip the key in a particular orientation. However, due to the physical structure of the key, the key may naturally tend to rest flat on a surface, thus limiting the number of possible orientations in which to grasp the key with the robotic manipulator. Accordingly, the robot may pick up the key in a first orientation, place the key on the support stand in a specific orientation that will be maintained by the support stand (e.g., stand the key upright to expose both sides of the key handle to the robotic manipulator), and pick up the key in a second orientation, thus allowing the robot to orient the key to fit into the corresponding lock.

The support stand may additionally be used to reposition an object when moving the object along a planned trajectory might cause the object to collide with other objects in the environment of the robotic device. In some embodiments, the robotic device may be working in close proximity to other robotic devices and the planned trajectory may be planned by a central control system that also controls the other robotic devices. The central control system may ensure that the trajectories for all the robotic devices do not result in collisions. Accordingly, the robotic device might not have permission from the central control system to change the planned trajectory. Similarly, repositioning the object may require less time than determining, by the central control system, different/alternative trajectories for all the robotic devices in order to avoid a potential collision. Thus, in order to avoid collisions, the robotic device may determine to reorient the object.

The support stand may be used to reposition and/or reorient objects with respect to a robotic manipulator of a robotic device in a number of other robotic applications including industrial manufacturing applications, semiconductor fabrication applications, medical application, and household aid applications. The support stand may be implemented in a number of passive and active designs.

In one example, the support stand may be a compliant cushion or support (e.g., a beanbag-like cushion) that molds itself readily to the contours of the objects placed thereon, thereby maintaining an orientation in which the object is placed thereon. The compliant cushion may be a cloth or plastic shell filled with chips, pellets, beans, granules, or similar small objects made of rubber, plastic, foam, paper, or other comparable material. Alternatively, the compliant cushion may be a foam, plastic, or rubber pad that molds itself readily to the contours of objects placed thereon. In some embodiments, the compliant support stand may include a plurality of flexible members vertically protruding from the surface of the support stand. The flexible members may be sufficiently rigid to maintain the object in the particular orientation and sufficiently flexible to allow a robotic manipulator of end effector thereof to penetrate the flexible members to access a physical/geometric feature of the object embedded in or obscured by the flexible members.

In another example, the support stand may include a plurality of actuated members. Each of the actuated members may be movable to collectively control a surface geometry of the support stand. The actuated support stand may be controlled to conform/mold itself to the geometric features of an object held by the robotic manipulator of the robotic device. The object may be placed on the actuated support stand in a particular orientation. The actuated support stand, when molded to the contours of the object, may receive and maintain the object in the particular orientation.

Alternatively, the actuated members of the support stand may be used to actively reorient the object to provide access for the robotic manipulator to grasp the object in the orientation dictated by the target pose. In one example, the object may be placed on the support stand in the particular orientation. The particular orientation may be referred to as a first resting orientation or a first repositioning orientation. The actuated members of the support stand may be actuated to reorient the object into a second repositioning orientation. The operation of actuating the members of the support stand to reposition the object disposed on the support stand from the first repositioning orientation to the second repositioning orientation may be performed to expose to the robotic manipulator a physical/geometric feature of the object to be grasped by the robotic manipulator to pick up the object in the second orientation with respect to the robotic manipulator. The actuated members may include mechanically movable members (e.g., pins/pillars) or pneumatically or hydraulically actuated flexible chambers, among other possible examples.

The control system of the robotic device may be configured to determine, based on data acquired from one or more sensors, a shape of an object of interest, at least one geometric feature of an object of interest, and/or at least one contour of an outer surface of the object of interest. Based on this determination, the control system may determine how to arrange/actuate the plurality of actuated members of the actuated support stand to conform the support stand to the shape, geometrical features, and/or contours of the object. The object may subsequently be placed on the conformed support stand to be maintained in a chosen orientation.

Alternatively, the object may be placed on the support stand in the particular orientation (e.g., the first repositioning orientation) for reorientation via the active support members. Specifically, the control system may determine how to arrange/actuate the plurality of actuated members of the actuated support stand to roll, tilt, or otherwise reorient the object on the support stand (e.g., reorient from the first repositioning orientation to the second repositioning orientation) in a manner providing better access for the robotic manipulator to grasp the object in the second orientation (e.g., the orientation dictated by the target pose).

In a further example, the support stand may include a plurality of different geometric/topological features. The plurality of geometric/topological features may include ridges, depressions, elevations, that may have different shapes including circular, rectangular, and triangular shapes. The features may vary in compliance/softness and may range from very rigid to very soft. A control system may be configured to, based on a determined shape, geometrical feature, or contour of an object, select at least one of the geometric/topological features of the support stand against which to support (e.g., lean on, rest on to of, place within) the object to maintain the object in a particular orientation.

Alternatively, the control system may be configured to, based on the determined shape, geometrical feature, or contour of the object, select at least one of the geometric/topological features of the support stand against which to contact (e.g., lean on, rest on to of, place within) the object to intentionally reorient the object due to a force of gravity in order to provide better access for the manipulator to grasp the object in the orientation dictated by the target pose. For example, the control system may determine that leaning the object against a specific geometrical feature of the support stand will cause the object to tilt or roll in a given direction, thus exposing a physical/geometric feature of the object for the robotic manipulator to grasp in the second orientation with respect to the robotic manipulator.

In general, the example embodiments and operations described herein may be particularly useful for robotic devices having only one arm, only one robotic manipulator, and/or only one end effector. Reorienting and/or repositioning an object between particular orientations using a robotic device having only one robotic manipulator may be difficult, time-consuming, and/or impossible due to the lack of additional arms, manipulators, and/or end effectors that may be used in cooperation to pick up, move, and/or reorient the object. A support stand may be less expensive to implement than a second robotic manipulator. Additionally, a support stand may take up less space than another robotic manipulator. However, the embodiments and operations described herein are not limited to robotic devices having only one arm, only one manipulator, and/or only one end effector. In some examples, robotic devices having multiple arms, manipulators, and/or end effectors may also benefit from using a support stand to reposition objects.

For example, under some conditions, a range of motion limit of a first robotic manipulator and a second robotic manipulator may prevent the robotic manipulators from working in coordination to reorient the object from a first orientation between the object and the first robotic manipulator to a second orientation between the object and the first robotic manipulator. In another example, using the support stand may be faster and/or less computationally intensive than coordinating two robotic manipulators to reorient the object. Thus, using the support stand may decrease an amount of time to complete a set of tasks by one or more robotic device.

II. EXAMPLE ROBOTIC SYSTEMS

FIG. 1 illustrates an example configuration of a robotic system that may be used in connection with the embodiments described herein. The robotic system 100 may be configured to operate autonomously, semi-autonomously, and/or using directions provided by user(s). The robotic system 100 may be implemented in various forms, such as a walking robot (e.g., biped, quadruped, hexaped, octoped), a wheeled robot, a robot on tracks, a stationary robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, electrical components 116, and communication link(s) 120. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, electrical components 116, and/or communication link(s) 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, the communication link(s) 120, and/or a user of the robotic system 100. In some embodiments, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. For instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

In some implementations, the control system 118 of robotic system 100 may also include communication link(s) 120 configured to send and/or receive information. The communication link(s) 120 may transmit data indicating the state of the various components of the robotic system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the robotic system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a particular piece of information (e.g. the operational state of one or more of the components of the robotic system 100). The processor(s) 102 may subsequently transmit the particular piece of information back out the communication link(s) 120.

In some cases, the communication link(s) 120 may include a wired connection. The robotic system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to move an object from an initial location of the object to a target location. The input to control system 118 may be received via the communication link(s) 120.

Based on this input, the control system 118 may perform operations to cause the robotic device 100 to use sensors 112 to scan an environment of the robot to locate the object and subsequently use mechanical components 110 to pick up and move the object from the initial location of the object to the target location of the object.

Operations of the control system 118 may be carried out by the processor(s) 102. Alternatively, these operations may be carried out by the controller 108, or a combination of the processor(s) 102 and the controller 108. In some embodiments, the control system 118 may partially or wholly reside on a device other than the robotic system 100, and therefore may at least in part control the robotic system 100 remotely. Communication link(s) 120 may be used at least in part to carry out the remote communication.

Mechanical components 110 represent hardware of the robotic system 100 that may enable the robotic system 100 to perform physical operations. As a few examples, the robotic system 100 may include physical members such as leg(s), arm(s), wheel(s), linkage(s), manipulators, and/or end effector(s). The physical members or other parts of robotic system 100 may further include motors and actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, legs, linkages, manipulators, and/or end effectors so that these members can be replaced or changed as needed or desired. In some embodiments, the robotic system 100 may include one or more removable and/or replaceable battery units or sensors. Other types of removable components may be included within some embodiments.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment, location of nearby objects, and/or identity of nearby objects, which may assist with environment recognition and navigation.

In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. The sensors may provide data indicative of two-dimensional (2D) and/or three-dimensional (3D) information about the environment. In some embodiments, processor(s) 102 may be configured to determine 3D information about the environment based on 2D information from two or more sensors.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, wheels, linkages, actuators, manipulators, end effectors, and/or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on one or more robotic members such as a arms, legs, wheels, linkages, manipulators, and/or end effectors to measure the load on the actuators that move the one or more members. As another example, the robotic system 100 may use one or more position sensors to sense the position of the actuators of the robotic system. For instance, such position sensors may sense states of extension, retraction, and/or rotation of the actuators on arms or legs.

As another example, the sensor(s) 112 may include one or more velocity and/or acceleration sensors. The sensor(s) 112 may measure both linear and angular velocity and/or acceleration. For instance, the sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, tracks, treads, linkages, manipulators, end effectors, and so on. In general, the robotic system 100 may be configured with zero or more legs. An implementation of the robotic system with zero legs may include wheels, tracks, treads, or some other form of locomotion. An implementation of the robotic system with two legs may be referred to as a biped or bipedal robot, and an implementation with four legs may be referred as a quadruped or quadrupedal robot. Implementations with six or eight legs are also possible.

Figure 2:
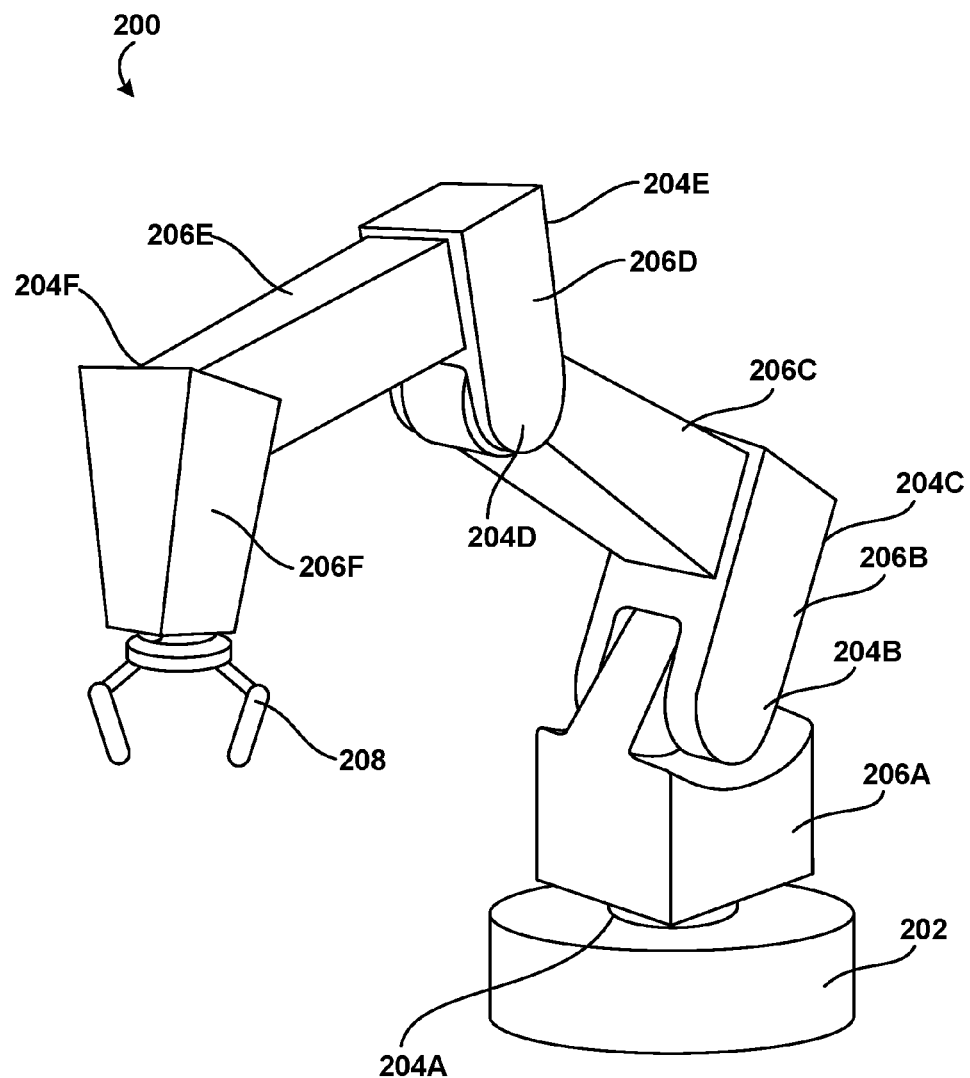
FIG. 2 illustrates an example robotic arm, according to an example embodiment.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or robotic manipulator/end effector 208. For example, the actuator in joint 204F may cause movement of appendage 206F and robotic manipulator/end effector 208 (i.e., since manipulator/end effector 208 is coupled to appendage 206F). Further, manipulator/end effector 208 may take on various forms and may include various parts. In one example, manipulator/end effector 208 may take the form of a gripper such as a finger gripper as shown here or a different type of gripper such as a suction gripper. In another example, end effector 208 may take the form of a tool such as a drill or a brush. In yet another example, the manipulator/end effector may include sensors such as force sensors, location sensors, and/or proximity sensors. Other examples may also be possible.

Figure 3:
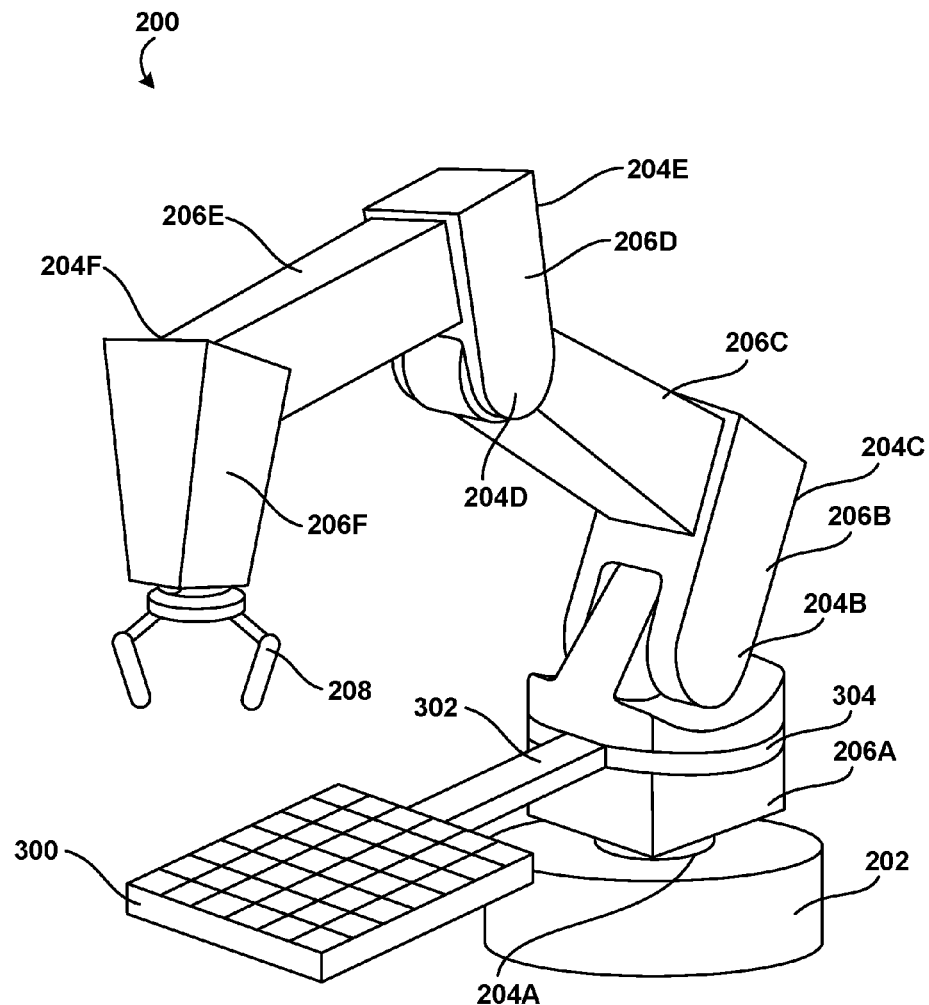
FIG. 3 illustrates an example support stand connected to an example robotic arm, according to an example embodiment.

FIG. 3 shows an example support stand 300 connected to the robotic arm 200 of FIG. 2. Support stand 300 may be any of the example support stand designs illustrated in FIGS. 6, 7A, 7B, 8A, 8B, 9A, and 9B. Support stand 300 may be connected to robotic device 200 through linkage 302 and rotational joint 304. Rotational joint 304 may be an actuated rotational joint configured to rotate the support stand 300 with respect to the base 202 of robotic arm 200 (e.g., joint 304 may produce yaw rotation). In other embodiments, support stand 300 may be connected to the robotic arm 200 or a portion thereof through two or more rotational joints. The two or more rotational joints may be actuated rotational joints configured to control a roll angle, pitch angle, and yaw angle of the support stand 300 with respect to robotic arm 200.

The two or more rotational joints may be used to position the support stand 300 to work in cooperation with robotic manipulator/end effector 208. For example, when the robotic manipulator 208 is initially picking up an object, the support stand 300 may be moved away from the manipulator 208 to avoid interfering with the operations of the manipulator 208. In another example, when the manipulator 208 is holding and moving an object, the support stand 300 may be maintained underneath the manipulator 208 to catch the object in the event the object falls or slips out of manipulator 208.

III. EXAMPLE OPERATIONS INVOLVING A SUPPORT STAND

Figure 4:
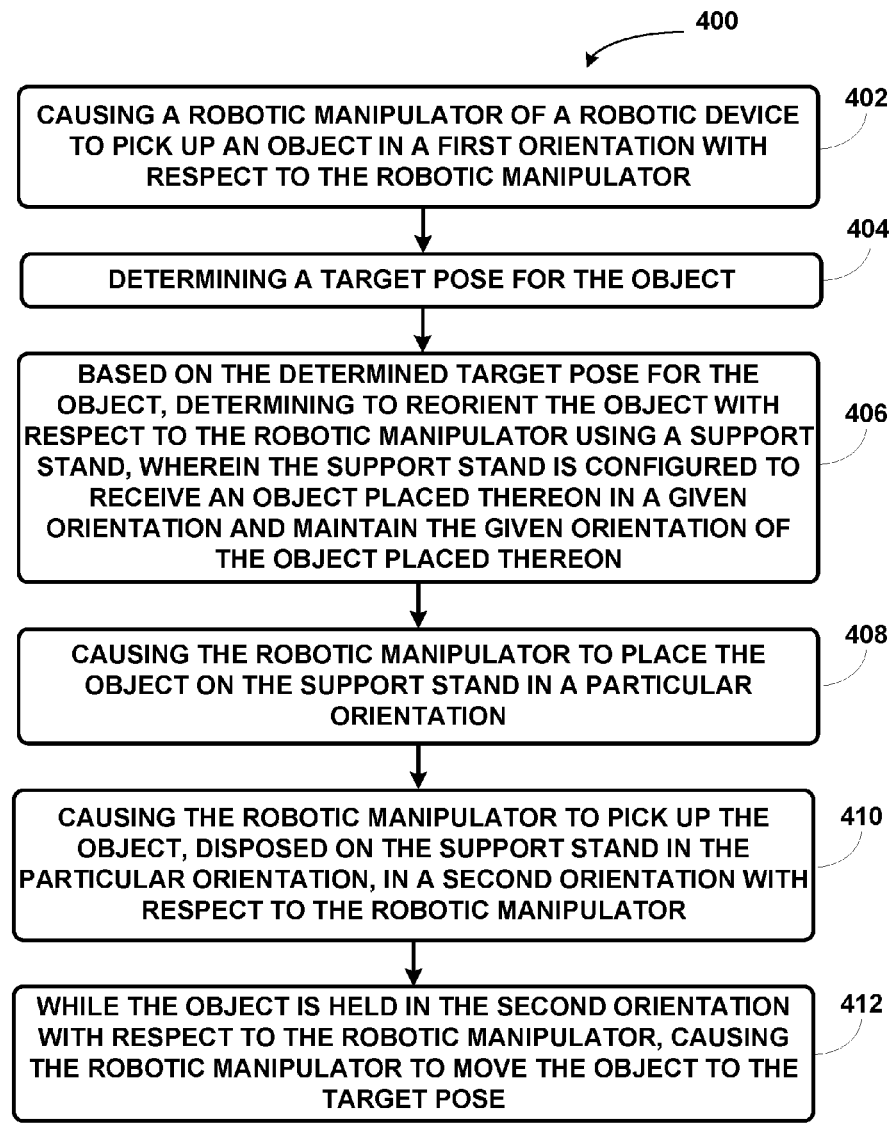
FIG. 4 illustrates a flow diagram of example operations, according to an example embodiment.

FIG. 4 illustrates example flow diagram 400 of example operations of a robotic system/device. In block 402, a robotic manipulator of a robotic device may be caused to pick up an object in a first orientation with respect to the robotic manipulator. Within examples, the first orientation may be a position and orientation of the object with respect to the robotic manipulator while the robotic manipulator is picking up, holding, and/or moving the object. The first orientation may include grasping, gripping, or otherwise engaging a specific physical/geometric feature, or portion thereof, of the object with the robotic manipulator and/or an end effector thereof. For example, when the object is a cup, the first orientation may include gripping the cup by a lip or sidewall (e.g., the sidewall that defines the volume of the cup) of the cup.

In block 404, the robotic system/device or a control system thereof may determine a target pose for the object. Within examples, the target pose may include a target location at which to place the object and a target orientation in which to place the object at the target location. The target pose may be determined based on a task that the robotic device is performing and/or at least one property of the object. For example, the robotic device may be configured to perform the task of loading a dishwasher with dirty dishes. The robotic device may search a kitchen or portions thereof for cups, plates, and/or utensils. Upon locating a cup, plate, or utensil, the robotic device may perform a detailed scan of the cup, plate, or utensil to determine whether the cup, plate, or utensil is clean or dirty. Upon finding a clean cup, the robotic device may determine the target pose for the clean cup to include placing the clean cup in a cupboard in a right-side-up orientation to increase an accessibility of the clean cup to a future user of the cup. Upon finding a dirty cup, the robotic device may determine the target pose for the dirty cup to include placing the dirty cup in the dishwasher in an upside-down orientation to increase an exposure of the inside of the cup to the stream of water from the spray arm of the dishwasher.

In block 406, based on the determined target pose for the object, the robotic device may determine to reorient the object with respect to the robotic manipulator by using a support stand. The support stand may be configured to receive an object placed thereon in a given orientation and may maintain the given orientation of the object placed thereon. Examples of support stands are illustrated in FIGS. 6, 7A, 7B, 8A, 8B, 9A, and 9B. The support stand may be within an area of reach of the robotic device. Within examples, reorienting the object may include changing the position and orientation of the object with respect to the robotic manipulator. Reorienting the object may include grasping, gripping, or otherwise engaging a different physical/geometric feature, or portion thereof, of the object with the robotic manipulator and/or an end effector thereof.

In block 408, the robotic manipulator may be caused to place the object on the support stand in a particular orientation. Placing the object on the support stand in the particular orientation may be a first operation in reorienting the object with respect to the robotic manipulator. The particular orientation may be an orientation of the object with respect to the support stand. For example, the particular orientation of the object with respect to the support stand may include the object being placed right side-up, upside-down, sideways, and/or tilted by a specific number of degrees. The particular orientation may include a specific geometric feature or features of the object being placed on the support stand.

In block 410, the robotic manipulator may be caused to reorient the object with respect to the robotic manipulator by causing the robotic manipulator to pick up the object, disposed on the support stand in the particular orientation, in a second orientation with respect to the robotic manipulator. Picking up the object in the second orientation may be a second operation in reorienting the object with respect to the robotic manipulator. Within examples, the second orientation may be a position and orientation of the object with respect to the robotic manipulator while the robotic manipulator is picking up, holding, and/or moving the object. The second orientation may include grasping, gripping, or otherwise engaging a specific physical/geometric feature, or portion thereof, of the object with the robotic manipulator and/or an end effector thereof. For example, when the object is a cup, the second orientation may include gripping the cup by a handle of the cup.

In block 412, the robotic manipulator may be caused to move the object to the target pose while the object is held in the second orientation with respect to the robotic manipulator. The object may be moved to a target location of the target pose and placed at the target location in a target orientation of the target pose.

The robotic device may determine to reorient the object for a plurality of reasons. In one example, after picking up the object in the first orientation, the robotic device may determine that, in order to move the object to the target pose, the robotic manipulator may need to pick up and hold the object in a second orientation different from the first orientation. The robotic device may determine that the first orientation of the object prevents the robotic device from moving the object to a target location of the target pose and orienting the object in a target orientation of the target pose due to, for example, a range of motion limit of joints of the robotic device.

In another example, the robotic device may determine, before picking up the object in the first orientation, an initial pose (e.g., position and orientation) of the object based on data from one or more sensors (e.g., camera, stereo camera, LIDAR, radar, and/or IR sensor, any of which may provide data indicative of 2D or 3D information). The robotic device may further determine that the initial pose of the object prevents the object from being picked up by the robotic manipulator in the second orientation. For example, a range of motion of the robotic device, the robotic manipulator, and/or an end effector thereof may prevent the object from being picked up in the second orientation. Alternatively, a portion or geometric feature of the object may be obstructed, occluded, or otherwise invisible or inaccessible to the robotic device while the object is in the initial pose, thus preventing the robotic manipulator from picking up the object in the second orientation. Accordingly, the robotic device may initially pick up the object in the first orientation and use the support stand to reorient the object into the second orientation, thus allowing the robotic device to move the object to the target pose.

In an additional example, one or more sensors may perform a scan of the object from a first perspective while the robotic manipulator holds the object in the first orientation. The robotic device or a control system thereof may determine to reorient the object in order to perform a scan of the object from a second perspective different from the first perspective to acquire additional information about any physical/geometrical features of the object. The robotic device may subsequently cause the one or more sensors to perform a scan of the object from the second perspective while the robotic manipulator holds the object in the second orientation.

In some embodiments, the support stand and/or a surface thereof may be of a specific color and/or may include a specific pattern (e.g., checkerboard). The specific color and/or the pattern may allow a control system of the robotic device to more clearly or easily differentiate between the support stand and the object when scanning the object (e.g., the color and/or pattern may create greater contrast between the object and the pattern and/or color of the support stand). In some implementations, the object, the support stand, and/or the sensor may be repositioned before scanning the object to use the colored and/or patterned surface of the support stand as a background in the scan. Recognizing features of the object against the known color and/or texture of the support stand may require less computational complexity than recognizing features of the object against a variable background of the environment.

In a further example, the robotic device may determine a trajectory for moving the object from an initial pose of the object to the target pose. The robotic device may reorient the object to prevent the object from colliding with one or more other objects in an environment of the robotic device as the object is moved to the target pose along the determined trajectory. For example, the scan of the object from the first perspective may reveal additional physical/geometrical features of the object that might not have been visible to the one or more sensors prior to picking up the object in the first orientation. The robotic device may determine, based on the determined trajectory and the additional physical/geometric features of the object, that moving the object along the determined trajectory may result in a collision with the one or more other objects in the environment of the robotic device.

In some embodiments, the determined trajectory may have been planned by a computing device or central control system configured to synchronize operations of multiple robotic devices. Accordingly, the robotic device may be constrained to follow the determined trajectory in order to prevent collisions with other robotic devices operating in an area of the robotic device. Thus, the robotic device may determine to reorient the object using the support stand into a second orientation that prevents the object from colliding with the other robotic devices and the one or more other objects in the environment of the robotic device. Alternatively, the robotic device and/or the central control system may determine that repositioning the object may take less time than determining new, alternative trajectories for the multiple robotic devices. Thus, the robotic device may determine to reposition the object using the support stand instead of re-planning new, alternative trajectories for the multiple robotic devices.

In a further example, the robotic device may receive sensor data indicative of a quality of grip of the robotic manipulator on the object. Based on the received sensor data indicating a low quality of grip, the robotic device may determine to reorient the object with respect to the robotic manipulator to minimize the chances of the robotic manipulator dropping the object. The sensor data may be received from one or more force sensors, torque sensors, and/or motor current sensors indicating a force applied to the object by the robotic manipulator. Sensor data indicating motor current may be used to determine a torque applied by the one or more motors to one or more corresponding members (e.g., linkages, digits) of the robotic manipulator while the robotic manipulator is holding the object. The torque may be used to indirectly compute a force applied to the object by the robotic manipulator. Alternatively, the sensor data may be data indicating a position of digits of the robotic manipulator in contact with the object. Unexpected changes in the position of the digits of the robotic manipulator may indicate that the object is moving within or slipping out of the robotic manipulator. The force, torque, and/or position of the digits may be used to indicate a quality of grip of the robotic manipulator on the object.

In a yet further embodiment, the robotic manipulator may be configured to change/swap between different, interchangeable end effectors (e.g., grippers or digits thereof). The interchangeable digits may be stored on a base of the robotic device (e.g., on a mobile base) and/or on a docking station of the robotic device. The robotic device may be configured to place the object on the support stand in the particular orientation using a first set of interchangeable digits. After placing the object on the support stand in the particular orientation, the robotic manipulator may exchange the first set of interchangeable digits for a second set of interchangeable digits. The robotic manipulator may use the second set of interchangeable digits to pick up the object from the support stand in the second orientation with respect to the robotic manipulator. The second set of interchangeable digits may be better adapter to pick up the object in the second orientation than the first set of interchangeable digits. For example, the second set of interchangeable digits may have a different size, shape, and/or may be made of a different material.

In some embodiments, sensor data from one or more vision sensors (e.g., camera, stereo camera, LIDAR, radar, and/or IR sensor, any of which may provide data indicative of 2D or 3D) may be used to determine that a position and/or orientation of the object with respect to the robotic manipulator is changing when the position and/or orientation is expected to remain constant/unchanged. The changing position and/or orientation may be an indication of a low quality of grip of the robotic manipulator on the object. The robotic device may determine to use the support stand to reorient the object to prevent the object from slipping out of the robotic manipulator, thus minimizing the chances of dropping the object.

The specific design of the support stand used in combination with the operations described herein may vary depending on the specific application of the robotic device. The support stand may be an actuated support stand. For example, the actuated support stand may be the support stand as illustrated in and described with respect to FIG. 6. Alternatively, the support stand may be a passive, non-actuated support stand. The support stand may be a compliant support stand, as illustrated in and described with respect to FIGS. 8A and 8B. In other examples, the support stand may be a support stand having a plurality of geometric features thereon, as illustrated in and described with respect to FIGS. 9A and 9B.

The support stand may be configured to receive an object placed thereon in a given orientation and may maintain the given orientation of the object placed thereon in order to enable the robotic device to plan a trajectory for moving the object to the target pose. In some embodiments, the support stand may maintain approximately the given orientation. Within examples, maintaining approximately the given orientation comprises maintaining an orientation that allows the robotic device to pick up the object in the second orientation to move the object to the target pose. Small deviations that do not prevent the robotic manipulator from picking up the object in the second orientation may fall within the extent of approximately the given orientation.

Without the support stand, the robotic device might be unable to achieve the second orientation due to, for example, range of motion limits of joints of the robotic device. Thus, the support stand may allow the robotic device to pick up, move, and manipulate objects that the robotic device might otherwise be unable to manipulate into specific orientations and target poses. For example, the support stand may allow the robotic device to grasp a key in an orientation that allows the robotic device to use the key to open and close locked doors. Without using the support stand, the dexterity of the robotic manipulator of the robotic device might be insufficient to pick up the key in the orientation required to use the key to open and close doors (e.g., the fingers of a robotic gripper may be too thick to pick up a key from a flat surface).

Additionally, the support stand allows the robotic device to avoid having to determine what orientation an object placed down on a surface in the environment ended up settling into. Specifically, since the support stand maintains the orientation of the object placed thereon, the robotic device may be configured to assume that the object placed on the support stand in a particular orientation will remain in the particular orientation. Thus, the robotic device might not need to perform an additional scan of the object to determine the orientation of the object before picking up the object again. The robotic device may have a high degree of certainty that the object is maintained by the support stand in the particular orientation. In some embodiments, the robotic device may receive sensor data from one or more sensors on or in the support stand that inform the robotic device whether the objects has shifted from the particular orientation and/or an extent by which the object has shifted (e.g., a distance by which the object has shifted, a number of degrees by which the object has rotated).

In contrast to the support stands described herein, a surface within the environment (e.g., a floor, table, shelf, etc.) might not maintain the particular orientation in which an object is placed on the surface. For example, a cup that is placed down on a flat tabletop in a tilted orientation may, upon being placed down on the tabletop, reorient itself, fall over, and/or roll away. A cup placed down on an inclined surface may likewise slide or roll away. In some instances, there might not be a way to reorient the object from the first orientation with respect to the robotic manipulator to the second orientation with respect to the robotic manipulator using a surface within the environment (e.g., a surface not configured to maintain the particular orientation in which objects are placed thereon). Accordingly, a support stand configured to maintain the particular orientation of objects placed thereon may allow the robotic manipulator to grip an object in orientations that would otherwise be unreachable.

Furthermore, the support stand may allow the robotic device to handle and move fragile objects. In particular, as discussed above, reorienting an object using a surface that is not configured to maintain the particular orientation of the object placed thereon may result in the object repositioning and/or reorienting itself after being placed down on the surface. The repositioning and reorienting may result in damage to the object. For example, when a cup is placed down in a tilted orientation, the cup may fall and fracture, shatter, and/or a handle of the cup may break off. However, since the support stand maintains the particular orientation in which an object is placed thereon, the risk associated with the object repositioning and/or reorienting itself is reduced or eliminated.

The support stand may be located within an area of reach of the robotic device. In some examples, the support stand may be connected directly to the robotic device through one or more actuated joints. The one or more actuated joints may be used to reposition the support stand to minimize an amount of time it takes the robotic device to move the object from an initial location of the object to the target pose. For example, prior to picking up the object in the first orientation, the support stand may be moved to a position adjacent to the initial location of the object. Movements of the support stand and of the robotic manipulator may be synchronized and/or coordinated to allow the robotic manipulator to use the support stand to reorient the object while the support stand is moved adjacent to a position of the target pose of the object.

In other examples, the support stand may be external to the robotic device. In other words, the support stand might not be mechanically/directly connected to the robotic device. The robotic device may be a stationary robotic device and the support stand may be a stationary support stand located adjacent to and within reach of the robotic device. Alternatively, the robotic device may be a mobile robotic device configured to use the robotic manipulator to pick up and move the support stand to a different location as the robotic device moves to the different location to perform operations in the different location. In some embodiments, the support stand may remain in a fixed location, and mobile robotic device may be configured to move to a location adjacent to the support stand to perform object reorientation operations. For example, the support stand may be integrated into a base station, charging station, or a docking station for the robotic device. A top surface of the docking station may include the support stand.

Figure 5A:
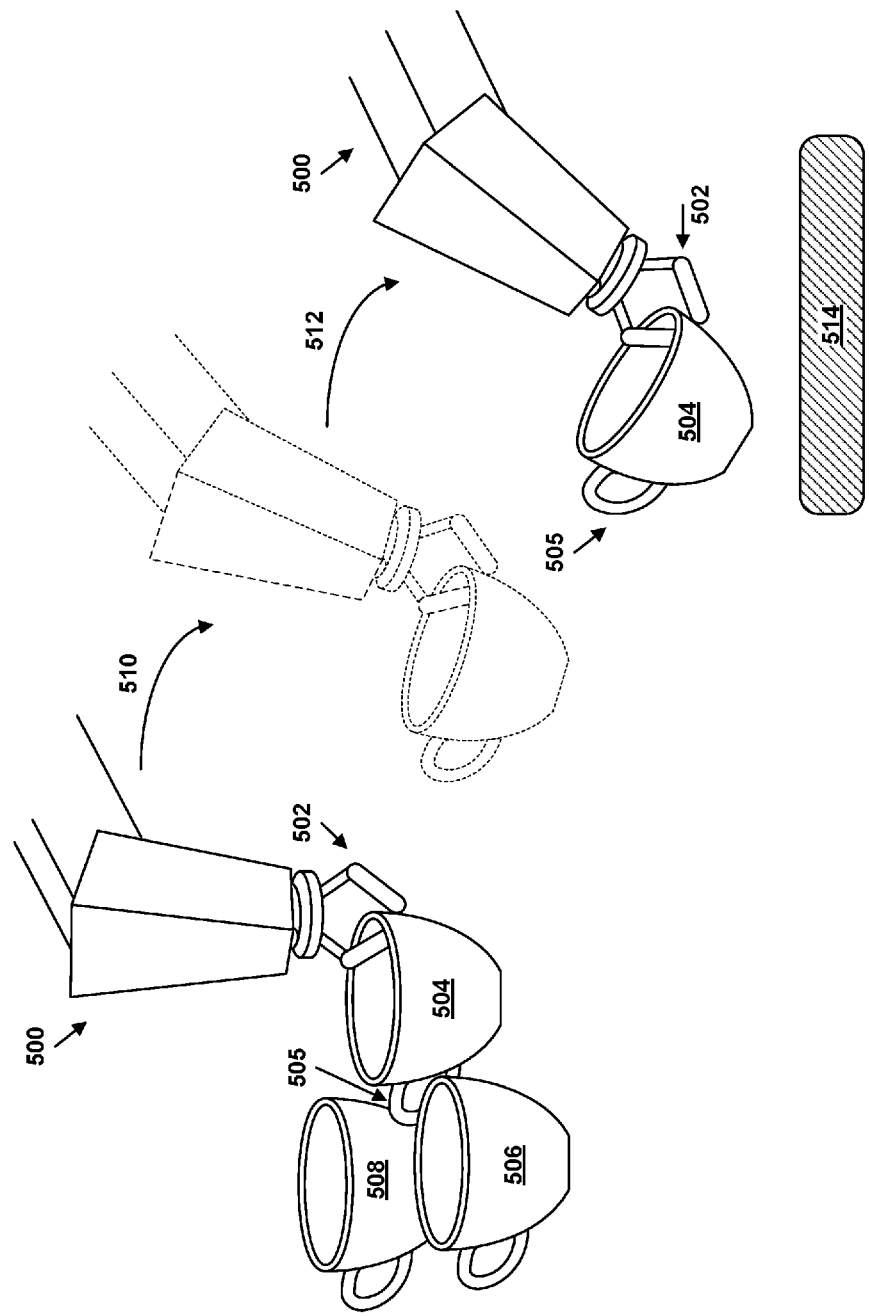
FIGS. 5A, 5B, and 5C illustrate the example operations involving a support stand, according to an example embodiment.
Figure 5B:
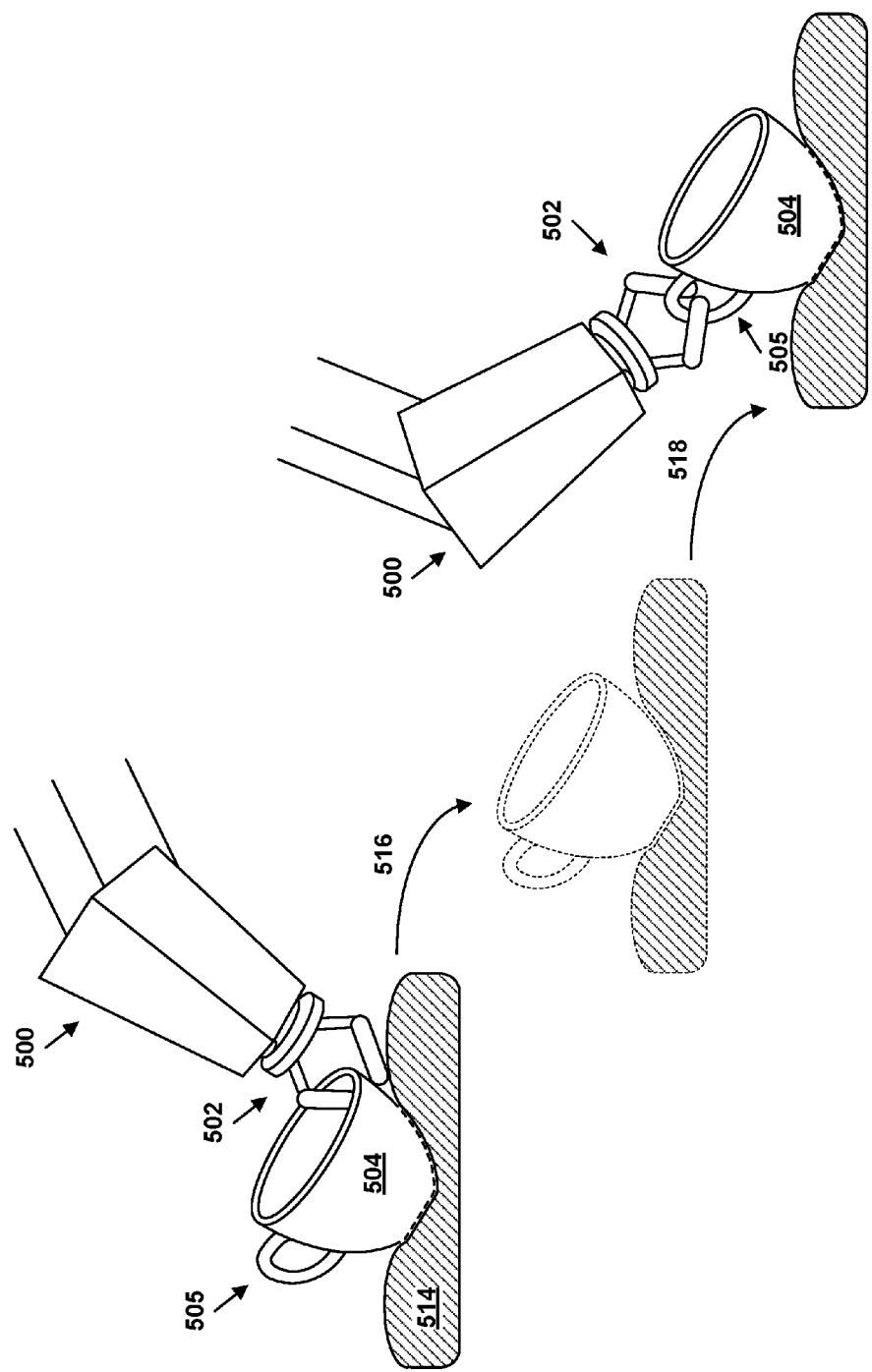
Figure 5C:
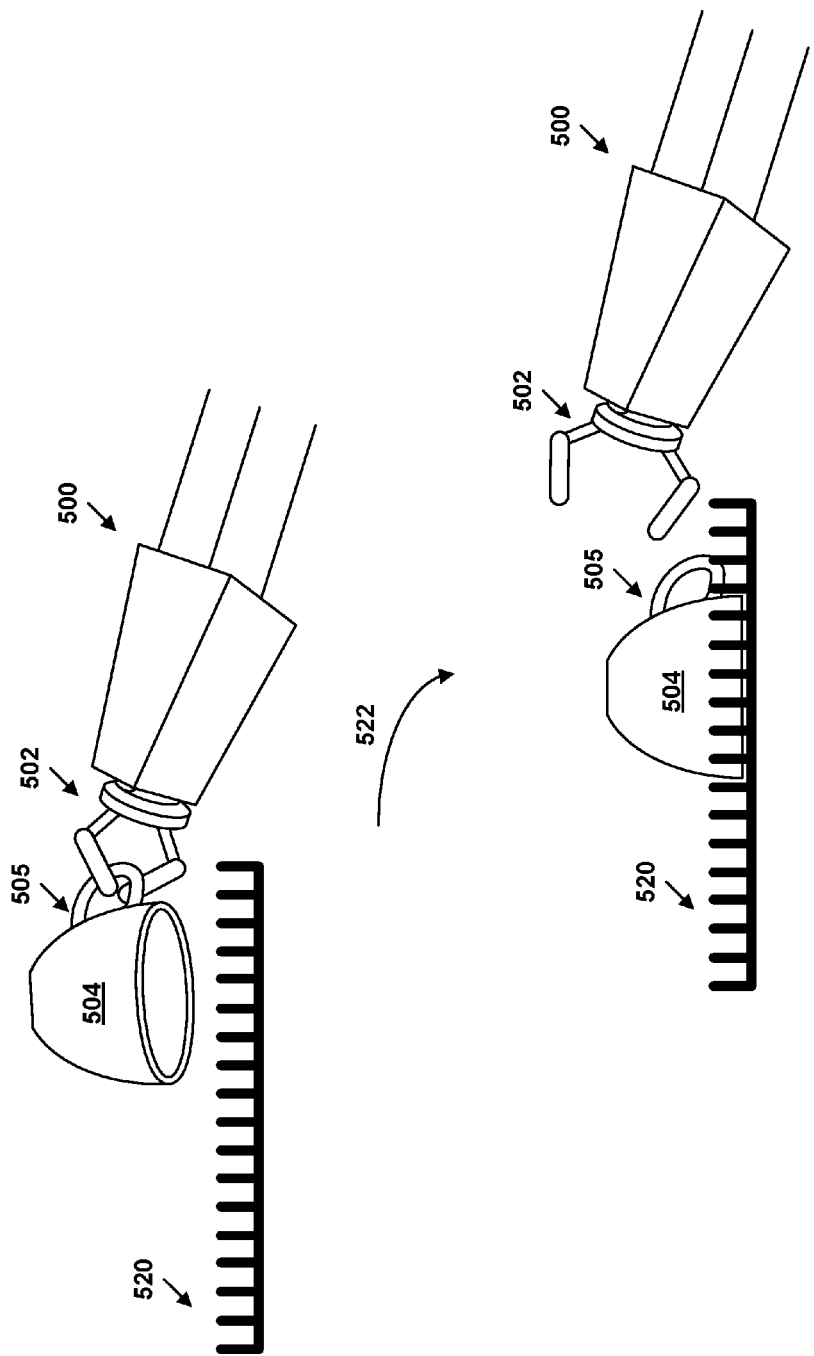

FIGS. 5A-5C illustrate robotic arm 500 and robotic manipulator 502 of a robotic device (e.g., robotic system 100, robotic device 200) performing the operations of flow diagram 400. Specifically, in FIG. 5A, robotic arm 500 moves gripper 502 to pick up cup 504 in a first orientation. The first orientation includes grasping a sidewall of the cup 504 with gripper 502. The robotic device or a control system thereof may determine, based on sensor data from one or more vision sensors, that the cup 504 is dirty. The control system may further determine that a target location of the cup 504 is a rack of a dishwasher and a target orientation of the cup 504 is upside down on the dishwasher rack. The target location and target orientation may collectively be referred to as a target pose. The control system may yet further determine that, in order to place cup 504 in on the dishwasher rack in an upside-down orientation, gripper 502 must grip the cup 504 by a handle 505 of cup 504. Gripping the handle 505 of cup 504 with gripper 502 may be an example of gripping an object in a second orientation with respect to the robotic manipulator of the robotic device.

Cup 504 is shown herein by way of example only. In general, the methods, processes, and operations described herein may be performed on or applied to any object of interest that can be manipulated by a robotic device. Similarly, robotic arm 500 and robotic manipulator 502 are shown as the robotic arm 206F and gripper 208 of robotic device 200 illustrated in FIG. 2. However, the robotic arm 500 and robotic manipulator 502 are not limited to the illustrated examples. Other combinations of robotic arms, manipulators, and end effectors may be possible.

In an initial position of the cup 504, the handle 505 of the cup 504 may be occluded, obstructed, or otherwise inaccessible to gripper 502 due to, for example, cups 506 and 508 being in close proximity to handle 505. Attempting to grasp handle 505 with gripper 502 while the handle 505 is in close proximity to cups 506 and 508 may cause gripper 502 to disturb, knock over, and otherwise damage cups 504, 506, and 508. Alternatively, a range of motion of the robotic device, the robotic arm 500, and/or the gripper 502 may prevent the gripper 502 from grasping cup 504 by the handle 505. Thus, although gripping the cup 504 by handle 505 (e.g., in a second orientation) may be required or preferred in order to move the cup to the target pose, the initial position and/or orientation of cup 504 and/or environmental features surrounding the cup 504 in the initial location, may prevent gripper 502 from grasping the handle 505 of cup 504. Alternatively, interference of the robotic arm 500 and/or or gripper 502 with itself or with the surrounding environment at the initial pose of the object, a pose of the object along the planned trajectory, and/or the target pose for the object may cause the control system of the robotic device to determine to pick up the object in the first orientation instead of the second orientation. Accordingly, the control system of the robotic device may determine to pick up cup 504 in a first orientation by grasping a lip/sidewall of cup 504 and reorient the cup 504 using support stand 514.

Robotic arm 500 may move gripper 502 to grasp cup 504 by a lip/sidewall of the cup 504. Robotic arm may move the cup 504 from an initial location of the cup to the support stand 514, as shown by arrows 510 and 512. In some embodiments, the support stand may be actuated and may move in coordination with the robotic arm 500 in order to minimize an amount of time spent on reorienting the cup 504. The cup 504 may subsequently be placed on the support stand 514 in a particular orientation, as shown in FIG. 5B.

The particular orientation may be maintained by the support stand in a number of ways. When the support stand is an actuated support stand, a surface geometry of the support stand may be modulated/modified to conform to the contours/geometric features of the cup 504 (e.g., create an imprint of the cup 504 in the support stand) before the cup is placed on the support stand 514. The contours of the cup 504 may be determined by the robotic device by scanning the cup 504 using one or more vision sensor before the cup is placed on the support stand 514.

Alternatively, the surface geometry of the support stand 514 may be modified in response to the weight of the cup 504 exerting a pressure on the surface of the support stand 514 as the cup 504 is placed on the support stand 514 and sinks into the support stand 514 under its own weight. In some embodiments, the cup 504 may be pressed into the support stand 514 by robotic arm 500 while the cup is held by gripper 502 to ensure the particular orientation is unchanged as the cup 504 settles into the support stand 514. A feedback system may sense a pressure and/or force gradient/distribution across the surface of the support stand 514 and may modify the surface of the support stand 514 to conform to the contours of the object.

In another embodiment, when the support stand 514 is a compliant support stand, the robotic arm 500 may push/press cup 504 into the compliant support stand while the cup 504 is held by the gripper 502. The weight of the cup 504 and/or the force of pushing/pressing the cup 504 into the compliant support stand 514 may cause the compliant support stand to conform to the contours of the cup 504 in the particular orientation. The compliant support stand 514 may maintain the particular orientation of cup 504 as the cup is disposed/rests on the compliant support stand 514.

After placing the cup 504 on the support stand 514 in the particular orientation, gripper 502 may release the lip/sidewall of cup 504, as shown in FIG. 5B. The support stand 514 may maintain the particular orientation of the cup 504 as the robotic arm 500 repositions gripper 502, according to arrows 516 and 518. The particular orientation in which cup 504 is placed and maintained on the support stand 514 may be chosen to expose a second portion or geometric feature (e.g., handle 505) of the cup to the gripper 502. The gripper may need to pick up the cup 504 by the handle 505 in order to orient the cup upside-down on a dishwasher rack of a dishwasher. The control system of the robotic device may determine the particular orientation in which to place cup 504 on support stand 514 based on the first orientation, the second orientation, and the target pose for the cup 504.

Specifically, the robotic device may determine a first plurality of poses in which the robotic arm 500 and the robotic manipulator 502 may place the cup 504 with the cup held in the first orientation. The robotic device may also determine a second plurality of poses in which the robotic arm 500 and the robotic manipulator 502 may place the cup 504 with the cup held in the second orientation. The robotic device may additionally determine a third plurality of poses that comprise the overlap of the first plurality of poses and the second plurality of poses. In other words, the third plurality of poses includes poses to which the cup can be moved while the cup is held in the first orientation as well as the second orientation (e.g., the mathematical intersection of the first plurality of poses and the second plurality of poses). The particular orientation may be chosen from the third plurality of poses.

As illustrated in FIG. 5B, placing the cup 504 on the support stand 514 in the particular orientation exposes the handle 505 of the cup 504 to gripper 502. The handle 504 is exposed by removing the cup from the proximity of cups 506 and 508 as well as by tilting the cup 504 sideways to point the handle 505 upwards such that gripper 502 can grasp handle 505. FIG. 5B additionally illustrates the robotic arm 500 repositioning the gripper 502 and the gripper 502 grasping the handle 505 of the cup 504. Having gripped the cup 504 in the second orientation (e.g., by the handle 505), the robotic arm 500 and the gripper 502 may move the cup 504 to the target pose.

FIG. 5C illustrates the robotic arm 500 moving and placing cup 504 in the target pose. The target pose for the cup 504 includes the cup 504 placed on dishwasher rack 520 in an upside-down orientation. After placing the cup 504 on the dishwasher rack 520, the gripper 502 releases the handle 505 of cup 504 to dispose the cup 504 on the dishwasher rack 520 in the target pose, according to arrow 522. The robotic arm 500 may then proceed to perform another task involving another object of interest. For example, the robotic arm 500 may proceed to move the remaining cups 506 and 508 to respective target poses.

Depending on the type of robot, the task assigned to the robot, and the type of object being operated on, the target pose of the object may include various target positions/locations and various target orientations corresponding to the target positions. For example, when the object is a key used to open a door, the target location may be the inside of a lock and the target orientation may be an orientation that allows the key to slide into the lock. In another example, the object may be a mechanical component on a vehicle assembly line. The target position and target orientation of the mechanical component may be determined based on a design blueprint of the particular vehicle being built by the robotic device. The mechanical component may have physical/geometric features that result in the object easily moving between different orientations as the object is moving along a conveyor belt (e.g., spherical, cylindrical, and/or conical portions that allow the object to roll into different orientations). Consequently, the mechanical component may need to be reoriented before it can be moved to the target pose by the robotic device.

IV. EXAMPLE SUPPORT STAND IMPLEMENTATIONS

FIGS. 6, 7A, 7B, 8A, 8B, 9A, and 9B illustrate example implementations of support stands that can be used by a robotic device to perform the operations disclosed herein. In general, the support stand may be implemented in a number of different ways that rely on different underlying operating principles. The support stand may be passive, active, or a combination of both. Similarly, the support stand may be compliant, rigid, or have a combination of compliant and rigid features.

Figure 6:
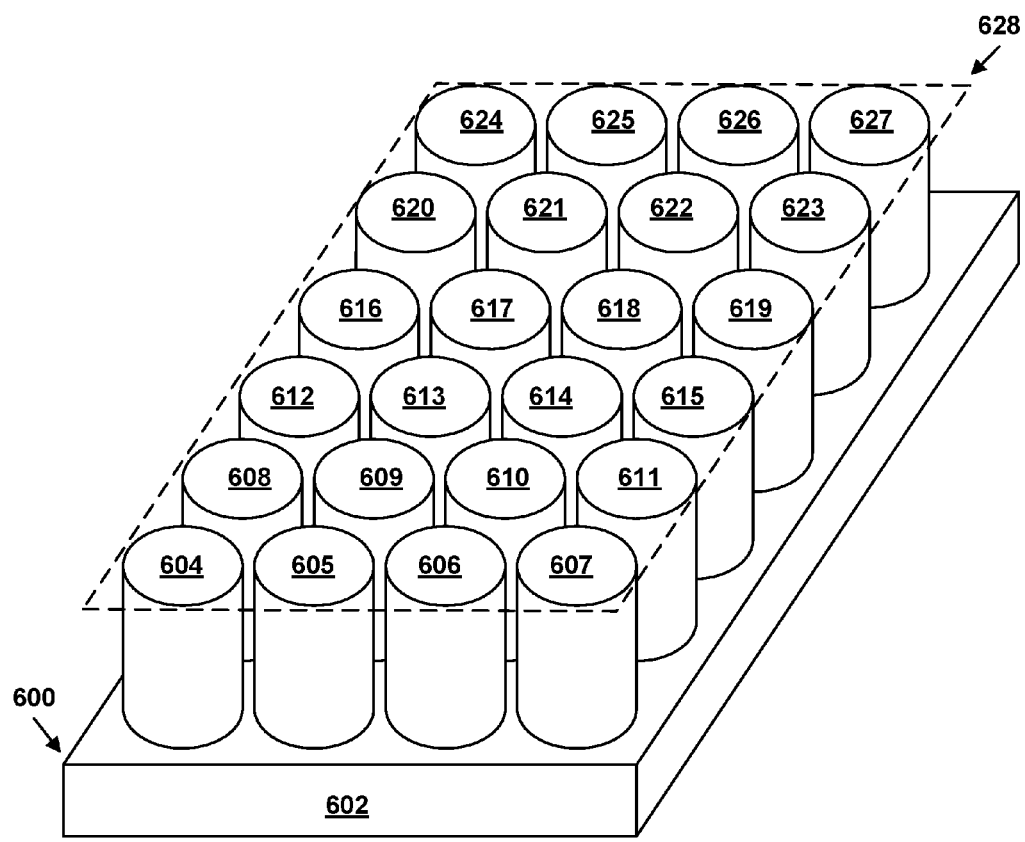
FIG. 6 illustrates an example support stand configuration, according to an example embodiment.

FIG. 6 illustrates an example support stand 600. The support stand 600 includes a base 602 and a plurality of actuated members 604-627 (support members, 604, 605, 606, 607, 608, 609, 610, 611, 612, 613, 614, 615, 616, 617, 618, 619, 620, 621, 622, 623, 624, 625, 626, 627). The actuated members 604-627 may be in the form of cylindrical pillars equally spaced from one another and arranged in a rectangular array. However, other shapes for the actuated members 604-627 and different spatial arrangements of the actuated members 604-627 are possible. Additionally, there may be more or fewer actuated members depending on a size of the base 602, the size of each of the actuated members, and the size of objects that the robotic device is configured to place on the support stand.

The actuated members 604-627 may be actuated to move in and out of base 602 mechanically (e.g., by motors), pneumatically by compressed gas, and/or hydraulically by pressurized liquid. For example, actuated members driven by motors may be rigid. Alternatively, actuated members driven pneumatically may be flexible membranes that extend and become rigid when pressurized and contract and become compliant when depressurized.

The tops of the actuated members 604-627 collectively make up a surface 628 (indicated by the dashed line) of the support stand. A control system of a robotic device may be configured to individually control each of the actuated members 604-627 to collectively change a surface geometry of the surface 628. The surface geometry of surface 628 may be changed to conform the surface 628 to an object of interest (to create an imprint of the object of interest in the surface 628). A ratio of a size of the object of interest to a size of an individual actuated member may determine the degree of precision with which the surface geometry of surface 628 can be controlled.

In some embodiments, the robotic device may be equipped with at least one vision sensor. The robotic device may use the vision sensor to determine at least one geometric feature of the object (e.g., determine the contours of the three-dimensional shape of the object by fitting a three-dimensional convex hull to the shape of the object). The robotic device may determine a particular position in which to place the object on the support stand in order to reorient the object from a first orientation with respect to the robotic manipulator to a second orientation with respect to the robotic manipulator. Based on the determined particular orientation and the determined geometric features, the actuated members 604-627 of the support stand 600 may be individually actuated so that the actuated members 604-627 collectively conform to the shape of the object. Before the object is placed on the support stand, the actuated members 604-627 may be locked (stopped from moving up or down) to "lock in" the surface geometry of surface 628. Thus, as the object is placed on the support stand 600, an approximate imprint of the object in the particular orientation is already present on the support stand 600 to receive the object in the particular orientation and maintain the object in the particular orientation determined by the robotic device.

In other embodiments, each of the actuated members 604-627 may be equipped with a force or pressure sensor. Before the object is placed on the support stand, the actuated members 604-627 may be fully extended out of the base 602. When the robotic device places the object on the support stand 600 in the particular orientation, the weight of the object will exert a force on support members that are in contact with the object. In response to sensing the force or pressure of the weight of the object, each of the actuated members in contact with the object may move down into the base 602 by an amount corresponding to the sensed force or pressure.

Alternatively, the robotic device may maintain the object in the particular orientation while pressing/pushing the object into the support stand 600. The force of the robotic device pushing the object will exert a force on support members that are in contact with the object. In response to sensing the force or pressure of the object pushing against the actuated members, each of the actuated members in contact with the object may move down by an amount corresponding to the sensed force or pressure. The movement of the actuated members may stop when at least one actuated member reaches a physical or programmed limit of motion.

In some embodiments, support stand 600 may be used to actively reposition and/or reorient the object placed thereon. Specifically, the object may be placed on support stand 600 in the particular orientation for reorientation via coordinated motion of the actuated members 604-627. The particular orientation in which the object is placed on the support stand 600 may be referred to as a first repositioning orientation.

The control system may determine how to arrange and/or actuate the plurality of actuated members of the actuated support stand to roll, tilt, or otherwise reorient the object on the support stand from the first repositioning orientation to a second repositioning orientation. The second repositioning orientation may provide better access for the robotic manipulator to grasp the object in the second orientation (e.g., the orientation dictated by the target pose). For example, reorienting the object from the first repositioning orientation to the second repositioning orientation may expose to the robotic manipulator a physical/geometric feature of the object to grasp with the robotic manipulator in the second orientation (e.g., roll a cup onto one side to point the handle of the cup upwards).

The operation of repositioning the object from the first repositioning orientation to the second repositioning orientation may be performed for any of the reasons contemplated herein. For example, the control system may determine to perform the repositioning operation based on an initial pose of the object, a trajectory for moving the robotic manipulator to the initial pose of the object and any potential collisions thereon, the target pose for the object, a trajectory for moving the object to the target pose and any potential collisions thereon, a range of motion of the robotic device, the first orientation between the robotic manipulator and the object, and/or the second orientation between the robotic manipulator and the object.

Figure 7A:
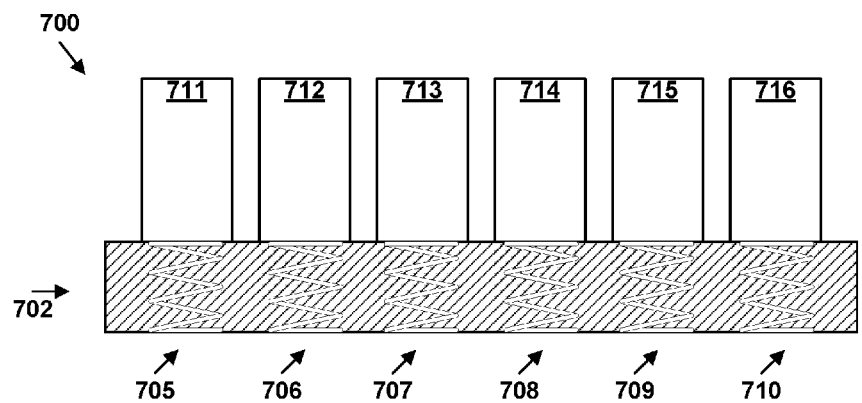
FIGS. 7A and 7B illustrate another example support stand configuration, according to an example embodiment.
Figure 7B:
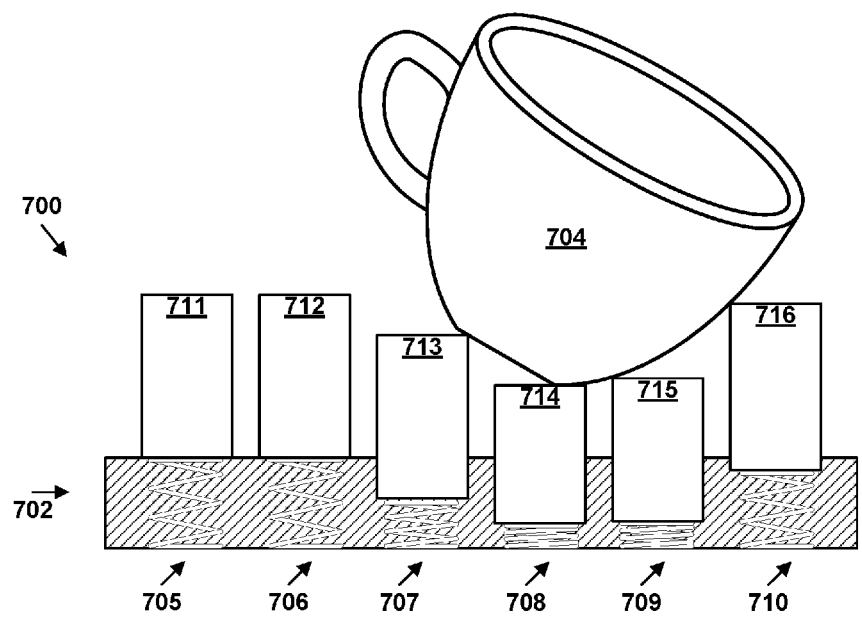

FIGS. 7A and 7B illustrate a cross-sectional view of another example support stand 700. Support stand 700 includes base 702 and a plurality of support members 711-716 (support members 711, 712, 713, 714, 715, and 716). Each of the support members 711-716 is biased outwards from base 702 by corresponding spring members 705-710. The spring members 705-710 may be mechanical springs (e.g., helical springs), pneumatic springs (e.g., gas springs), hydraulic springs/dampers, or a combination thereof (e.g., hydraulic damper biased by a mechanical spring). The spring members 705-710 may be passive (e.g., a sealed gas spring with a fixed amount of air enclosed therein) or active (e.g., a gas spring with a valve through which the amount of air inside the spring can be controlled to change the spring stiffness).

FIG. 7B illustrates cup 704 placed on support stand 700 in a particular orientation. In some embodiments, the particular orientation may be maintained by the support stand 700 passively (e.g., the object naturally falls into and rests in the particular orientation due to a mass distribution of the object). In other embodiments, the particular orientation may be maintained actively by locking in the positions of each of the support members 711-716 once the particular orientation is achieved. The locking may be done mechanically (e.g., by a ratchet and pawl mechanism), pneumatically (e.g., by increasing the air pressure to counteract the weight of the cup 704), or hydraulically (e.g., by increasing a viscosity of a rheological fluid in a hydraulic damper). The particular orientation may initially be achieved as discussed above with respect to FIG. 6.

In some embodiments, the support members 711-716 may be flexible (e.g., rubber) members protruding from the base 702. The flexible support members 711-716 may have an inherent, spring-like quality (e.g., due to the material from which the support members are made). Thus, springs 705-710 may be omitted due to the flexible support members 711-716 inherently behaving like springs (possessing spring-like qualities). There may be more flexible support member than shown in FIGS. 7A and 7B and the flexible support members may be more densely spaced on the base 702. In addition to exhibiting spring-like properties in the vertical direction, as shown in FIGS. 7A and 7B, the flexible support members may exhibit spring-like properties in the horizontal direction. Consequently, the robotic manipulator or end effector thereof may be able to penetrate and/or move through the flexible support members to reach a feature of the object 704 that may be embedded in, resting in between, or obscured by the flexible support members. Thus, a support stand made up in whole or in part of passive, flexible, spring-like members may allow the robotic manipulator to pick up the object disposed thereon in a number of additional orientations (e.g., second orientation) that would otherwise be inaccessible in a support stand with inflexible support members.

Figure 8A:
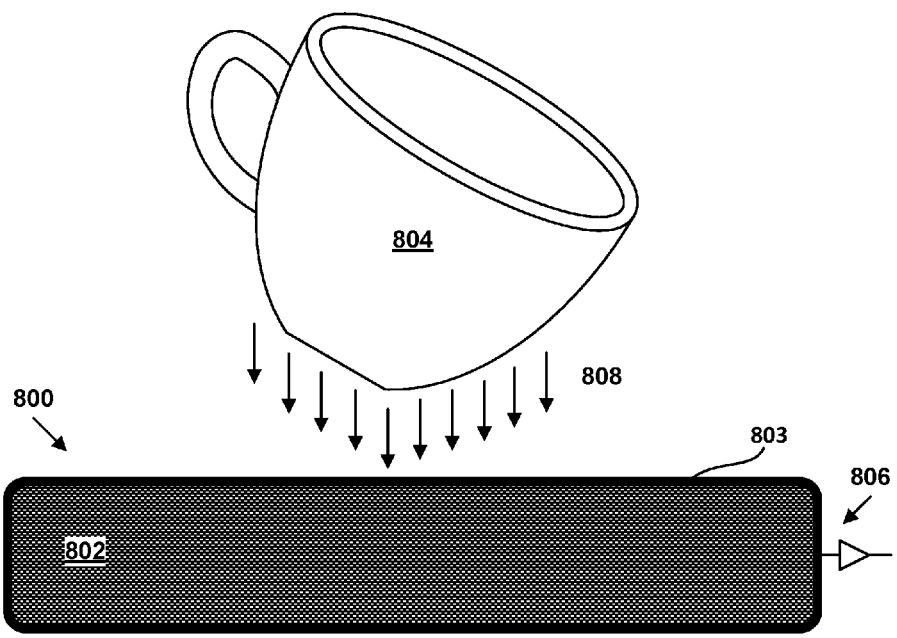
FIGS. 8A and 8B illustrate a further example support stand configuration, according to an example embodiment.
Figure 8B:
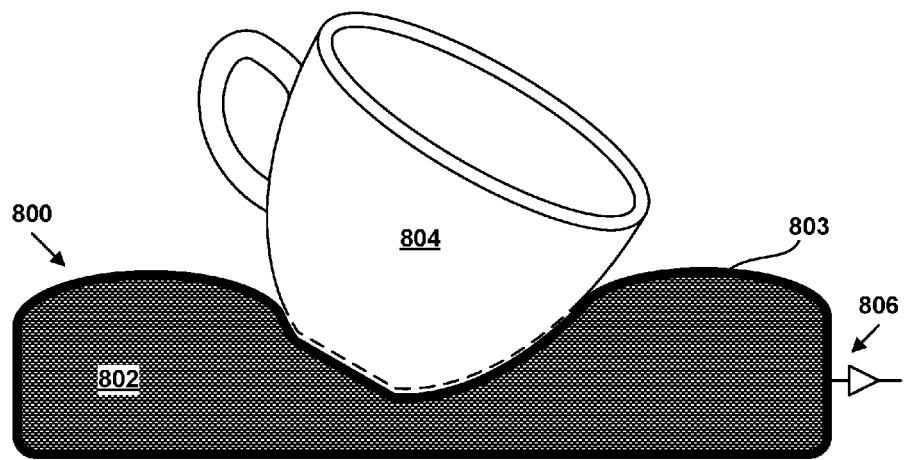

FIGS. 8A and 8B illustrate a further example design of a support stand. Support stand 800 includes a flexible membrane 803 filled with a granular material such as salt, sugar, glass beads, coffee grounds, or sand. An active version of support stand 800 may additionally include a gas (e.g. atmospheric air) flow valve 806 for pressurizing and depressurizing the flexible membrane 803. A passive version of support stand 800 may omit gas flow valve 806.

FIG. 8A illustrates support stand 800 in a neutral, unconformed (e.g., rectangular) state/shape. When cup 804 is pressed into support stand 800, as indicated by arrows 808, the granular material 802 shifts inside the membrane 803 to conform to the bottom and sides of cup 804, as illustrated in FIG. 8B by the bulging sides of support stand 800. In a passive implementation of support stand 800, the support stand may remain in the conformed orientation shown in FIG. 8B due to the weight of the cup 804. Specifically, in a passive implementation, the type of granular material and the elasticity of the membrane 803 may be chosen to ensure that the particular orientation of the objects placed on the support stand 800 is maintained (e.g., due to the weight of the object) while the object is disposed on the support stand 800.

In an active implementation utilizing gas flow valve 806, a control system of the robotic device and the support stand may cause a pump (not shown) to remove gas from the membrane 803 through valve 806 after the object is pressed into the support stand 800. Removing gas from the membrane 803 (e.g., creating negative pressure inside membrane 803) will cause the grains of the granular material 802 to pack together tightly (the grains undergo a jamming transition), thereby locking in the support stand conformation shown in FIG. 8B. After the robotic device removes the object from the support stand, gas can be reintroduced into membrane 803, allowing the grains of granular material 802 to return to a more fluid-like state, thereby causing support stand 800 to return to the original conformation shown in FIG. 8A.

In another implementation, granular material 802 may be omitted from membrane 803. Instead, membrane 803 may be filled with a fluid (e.g., a liquid or a gas). When the fluid is a liquid, a viscosity of the liquid may be chosen based on an expected weight of objects placed on support stand 800. Alternatively, a viscosity of the liquid may be dynamically controllable based on the weight of the object 804 placed thereon (e.g., the liquid may be a rheological/magnetorheological fluid). When the fluid is a gas, a pressure of the gas in membrane 803 may be adjusted based on the weight of object 804.

When object 804 is placed on the support stand, membrane 803 and the fluid therein may conform to the shape of object 804 and maintain the object 804 in the particular orientation. Valve 806 may be operated to inject or release fluid from membrane 803 to receive and maintain the object in the particular orientation in which the object is placed on the support stand. In some embodiments, the robotic manipulator may push or press a particular region of the support stand to reorient the object 804 from a first repositioning orientation (e.g., the particular orientation in which the object is placed on the support stand) into a second repositioning orientation. Pressing down on the particular region of the support stand 800 may cause the support stand 800 to bulge out in response to the increased pressure, thus reorienting object 804 on the support stand (e.g., causing cup 804 to rotate to a different orientation). The control system of the robotic device may be configured to determine a portion of the support stand 800 to press down on with the robotic manipulator to cause object 804 to reorient from the first repositioning orientation into the second repositioning orientation. Additionally, the control system may determine a force with which to press down on the portion of the support stand to reorient object 804 on the support stand.

Figure 9A:
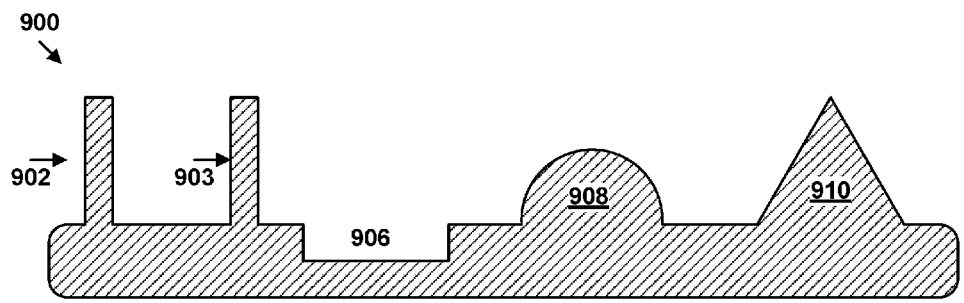
FIGS. 9A and 9B illustrate a yet further example support stand configuration, according to an example embodiment.
Figure 9B:
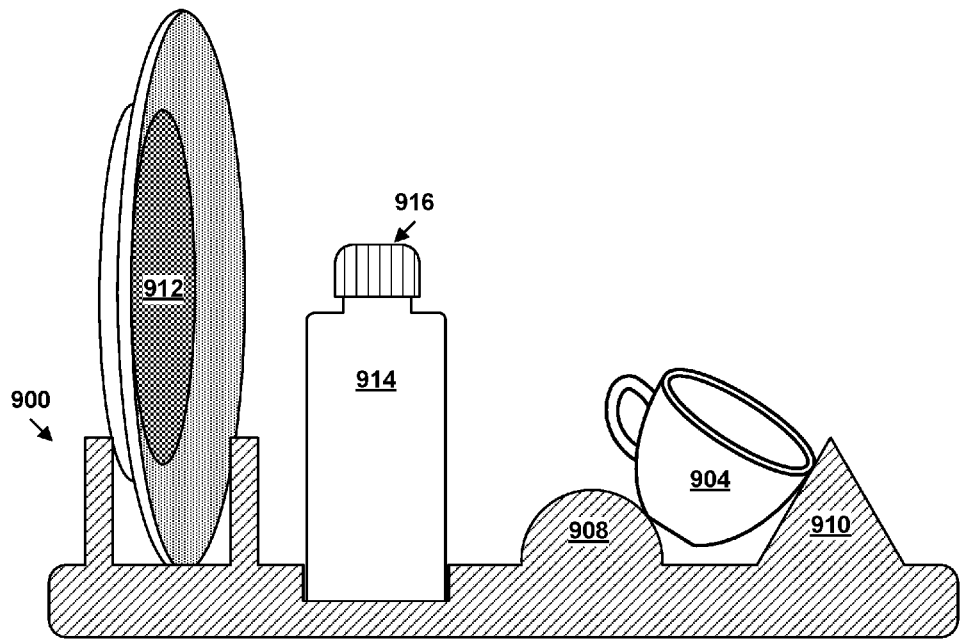

FIGS. 9A and 9B illustrate yet another example of a support stand. Specifically, FIG. 9A illustrates a cross-sectional view of support stand 900 having a plurality of geometric features 902, 903, 906, 908, and 910. The geometric features may include ridges 902 and 903, depressions 906, spherical or cylindrical domes 908, and triangular or conical protrusions 910. The size, shape, and number of geometrical features 902, 903, 906, 908, and 910 may be different depending on the type of application the robotic device and support stand 900 are used for. For example, a robotic device intended to load a dishwasher may use a support stand with a large number of smaller geometric features. In contrast, an automotive assembly robot may use a support stand with a small number of large, rigid geometric features.

In some embodiments, the geometric features 902, 903, 906, 908, and 910 may be made of foam, sponge, or other compliant and compressible material. In other embodiments, the geometric features 902, 903, 906, 908, and 910 may be made of a rigid plastic, metal, or other comparable material. Alternatively, some embodiments may utilize a combination of rigid and compliant materials. For example, the core of each geometric feature may be rigid while the outer surface may be padded with a compliant material. Thus, the geometric features may conform to contours of objects placed thereon while at the same time offering ample structural support to the objects placed thereon, thus maintaining approximately the orientation in which the objects are originally placed on the support stand.

The robotic device and control system thereof may be aware of what geometric features are present on support stand 900 or may use one or more sensors to determine the geometric features. The robotic device may use the one or more sensors to scan an object and determine at least one geometric feature of the object based on the scan. The robotic device may subsequently select, based on the at least one geometric feature of the object, at least one geometric feature of the support stand 900 against which to support the object to maintain the object in a particular orientation.

FIG. 9B illustrates examples of selecting a geometric feature of the support stand 900 for supporting objects in a particular orientation. Specifically, the control system of the robotic device may determine geometric features of plate 912 by, for example, fitting a three-dimensional convex hull to the plate 912 and approximating the shape of the plate as a disc. The control system may subsequently select ridges 902 and 903 for supporting plate 912 in the particular orientation shown in FIG. 9B. The control system may determine that placing the plate 912 between ridges 902 and 903 will cause plate 912 to remain balanced and supported on the support stand 900.

Similarly, the control system may determine that a bottom portion of bottle 914 is a rectangular prism and may be supported in depression 906. In addition to reorienting bottle 914, the robotic device may use support stand 900 to prevent bottle 914 from twisting while the robotic device uses a robotic manipulator to remove (e.g., twist off) cap 916 from bottle 914. A robotic device with only one robotic arm and/or only one robotic manipulator might otherwise be unable to remove cap 916 from bottle 914. In the case of a robotic device with multiple robotic manipulators, using support stand 900 to aid the removal of cap 916 from bottle 914 may be less complex and more accurate than coordinating two moving robotic manipulators to remove cap 916 from bottle 914.

The control system may also determine that the identified geometric features of the object (e.g., cup 904) in the particular orientation do not have a corresponding geometric counterpart on the support stand 900 (e.g., rectangular bottom of bottle 914 fits in rectangular depression 906). In response, the control system may select one or more geometric features of the support stand 900 that will support the object in the particular orientation.

For example, the control system may determine that cup 904 may be supported in the particular orientation by placing the cup 904 between geometric feature 908 and geometric feature 910. In addition to selecting geometric features of support stand 900 that maintain the particular orientation, the control system may select the one or more geometric features that maximize an amount of surface area of the object (e.g., cup 904) in contact with the selected geometric features. Thus, the control system may select geometric features of support stand 900 that offer the most support and stability to the object in the particular orientation.

Alternatively, the control system may be configured to, based on the determined shape, geometrical feature, or contour of the object, select at least one of the geometric/topological features of the support stand 900 against which to contact (e.g., lean on, rest on to of, place within) the object to intentionally reorient the object due to a force of gravity. Intentionally reorienting the object using the force of gravity may provide better access for the robotic manipulator to grasp the object in the orientation dictated by the target pose (e.g., the second orientation). For example, the control system may determine that placing a bottom of bottle 914 on top of dome 908 of the support stand 900 will cause the bottle 914 to lean and fall to the left or to the right of the dome 908, thus reorienting the bottle from the vertical orientation into an orientation closer to a horizontal orientation.

In some embodiments, the geometric features of support stand 900 may be actuated to better conform to objects placed on the support stand 900. In other embodiments, the geometric features may be rearranged on the support stand 900 to modify the arrangement of the geometric features to maintain the object in the particular orientation in which the object is placed on the support stand. For example, the ridges 902 and 903 may be movable to increase and decrease a distance between the ridges. Increasing the distance between the ridges may allow the robotic device to maintain multiple plates in the orientation shown in FIG. 9B.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long-term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
a robotic device comprising a robotic manipulator;
a sensor;
a support stand configured to receive an object placed thereon in a given orientation and maintain the given orientation of the object placed thereon; and
a control system configured to:
   determine, based on sensor data indicative of an environment and received from the sensor, a target pose for an object within the environment;
   determine a second orientation with respect to the robotic manipulator in which to pick up the object to move the object to the target pose;
   based on the second orientation, determine a repositioning orientation in which to place the object on the support stand to reorient the object with respect to the robotic manipulator using the support stand;
   based on the repositioning orientation, determine a first orientation with respect to the robotic manipulator in which to pick up the object;
   cause the robotic manipulator to pick up the object in the first orientation and place the object on the support stand in the repositioning orientation; and
   cause the robotic manipulator to pick up the object, disposed on the support stand in the repositioning orientation, in the second orientation with respect to the robotic manipulator and, while the object is held in the second orientation with respect to the robotic manipulator, cause the robotic device to move the object to the target pose.

2. The system of claim 1, wherein the control system is further configured to:
   determine, based on the sensor data, an initial pose of the object;
   before causing the robotic manipulator to pick up the object in the first orientation, determine that the initial pose of the object prevents the object from being picked up by the robotic manipulator in the second orientation; and
   based on determining that the initial pose of the object prevents the object from being picked up by the robotic manipulator in the second orientation, (i) cause the robotic manipulator to pick up the object in the first orientation and (ii) determine to reorient the object with respect to the robotic manipulator using the support stand.

3. The system of claim 2, wherein the control system is configured to determine that the initial pose of the object prevents the object from being picked up by the robotic manipulator in the second orientation by:
   determining that a range of motion limit of the robotic manipulator prevents the object from being picked up by the robotic manipulator in the second orientation.

4. The system of claim 2, wherein the control system is configured to:
   determine a trajectory for moving the robotic manipulator to pick up the object from the initial pose in the second orientation; and
   determine that the initial pose of the object prevents the object from being picked up by the robotic manipulator in the second orientation by determining, based on the determined trajectory, one or more potential collisions between the robotic manipulator and one or more other objects in an environment of the robotic device.

5. The system of claim 1, wherein the control system is configured to determine the target pose for the object by:
   determining a target location to which to move the object; and
   based on the target location, determining a target orientation in which to place the object at the target location.

6. The system of claim 1, wherein the control system is further configured to:
   determine, based on the sensor data, two or more geometric features of the object;
   select a first geometric feature of the two or more geometric features by which to pick up the object in the first orientation to reorient the object with respect to the robotic manipulator to expose a second geometric feature to the robotic manipulator; and
   select the second geometric feature of the two or more geometric features by which to pick up the object in the second orientation to move the object to the target pose.

7. The system of claim 1, wherein the control system is further configured to:
   determine one or more geometric features of the object based on the sensor data; and
   determine the target pose for the object based on the one or more determined geometric features of the object.

8. The system of claim 7, wherein the control system is further configured to:
   determine the repositioning orientation in which to place the object on the support stand based on (i) the one or more determined geometric features of the object and (ii) the target pose for the object.

9. The system of claim 1, wherein the control system is further configured to:
   cause the sensor to perform a scan of the object from a first perspective while the robotic manipulator holds the object in the first orientation;
   determine to reorient the object with respect to the robotic manipulator to perform a scan of the object from a second perspective different from the first perspective; and
   cause the sensor to perform a scan of the object from the second perspective while robotic manipulator holds the object in the second orientation.

10. The system of claim 1, wherein the control system is further configured to:
    determine a trajectory for moving the object to the target pose; and
    determine, based on the determined trajectory, to reorient the object with respect to the robotic manipulator using the support stand to prevent the object from colliding with one or more other objects within the environment as the object is moved along the determined trajectory.

11. The system of claim 1, wherein the support stand is actuated to control a surface geometry of the support stand, and wherein the control system is further configured to:
    in response to causing the robotic manipulator to place the object on the support stand in the repositioning orientation, actuate the support stand to change the surface geometry of the support stand to create an imprint of at least a portion of the object in the repositioning orientation; and
    maintain the changed surface geometry while the object is disposed on the support stand in the repositioning orientation.

12. The system of claim 1, wherein the repositioning orientation is a first repositioning orientation, wherein the support stand is actuated to control a surface geometry of the support stand, and wherein the control system is further configured to:
    in response to causing the robotic manipulator to place the object on the support stand in the first repositioning orientation, actuate the support stand to change the surface geometry of the support stand to receive the object in the first repositioning orientation;
    actuate the support stand to reorient the object from the first repositioning orientation into a second repositioning orientation different from the first repositioning orientation; and
    cause the robotic manipulator to pick up the object, disposed on the support stand in the second repositioning orientation, in the second orientation with respect to the robotic manipulator.

13. The system of claim 1, wherein the support stand is a compliant support stand, and wherein the control system is further configured to:
    cause the robotic manipulator to place the object on the compliant support stand in the repositioning orientation by pushing at least a portion of the object into the compliant support stand to create an imprint in the compliant support stand of at least a portion of the object in the repositioning orientation.

14. The system of claim 1, wherein the support stand comprises a plurality of geometric features, and wherein the control system is further configured to:
    determine one or more geometric features of the object based on the sensor data; and
    select, based on the one or more geometric features of the object, at least one geometric feature of the plurality of geometric features of the support stand against which to support the object to maintain the object in the repositioning orientation.

15. The system of claim 1, wherein:
    the support stand is connected to the robotic device through at least one actuated joint; and
    the control system is further configured to:
        provide instructions to actuate the at least one actuated joint to position the support stand adjacent to the object before causing the robotic manipulator to pick up the object in the first orientation; and
        provide instructions to actuate the at least one actuated joint to position the support stand adjacent to a location of the target pose before causing the robotic manipulator to pick up the object in the second orientation.

16. The system of claim 1, wherein:
    the robotic device is a mobile robotic device; and
    the control system is further configured to:
        provide instructions to cause the mobile robotic device to navigate to a position adjacent to a location of the target pose before causing the robotic manipulator to move the object to the target pose.

17. A method comprising:
    determining, based on sensor data indicative of an environment and received from a sensor, a target pose for an object within the environment;
    determining a second orientation with respect to a robotic manipulator of a robotic device in which to pick up the object to move the object to the target pose;
    based on the second orientation, determining a repositioning orientation in which to place the object on a support stand to reorient the object with respect to the robotic manipulator using the support stand, wherein the support stand is configured to receive the object placed thereon in a given orientation and maintain the given orientation of the object placed thereon;
    based on the repositioning orientation, determining a first orientation with respect to the robotic manipulator in which to pick up the object;
    causing the robotic manipulator to pick up the object in the first orientation and place the object on the support stand in the repositioning orientation; and
    causing the robotic manipulator to pick up the object, disposed on the support stand in the repositioning orientation, in the second orientation with respect to the robotic manipulator and, while the object is held in the second orientation with respect to the robotic manipulator, causing the robotic manipulator to move the object to the target pose.

18. The method of claim 17, wherein the repositioning orientation is a first repositioning orientation, wherein the support stand is actuated to control a surface geometry of the support stand, and wherein the method further comprises:
    in response to causing the robotic manipulator to place the object on the support stand in the first repositioning orientation, actuate the support stand to change the surface geometry of the support stand to receive the object in the first repositioning orientation;
    actuate the support stand to reorient the object from the first repositioning orientation into a second repositioning orientation different from the first repositioning orientation; and
    cause the robotic manipulator to pick up the object, disposed on the support stand in the second repositioning orientation, in the second orientation with respect to the robotic manipulator.

19. The method of claim 17, wherein the support stand comprises a plurality of geometric features, and wherein the method further comprises:
    determining one or more geometric features of the object based on the sensor data; and
    selecting, based on the one or more geometric features of the object, at least one geometric feature of the plurality of geometric features of the support stand against which to support the object to maintain the object in the repositioning orientation.

20. A non-transitory computer readable medium having stored thereon instructions that, when executed by a computing device, cause the computing device to perform operations comprising:
    determining, based on sensor data indicative of an environment and received from a sensor, a target pose for an object within the environment;
    determining a second orientation with respect to a robotic manipulator of a robotic device in which to pick up the object to move the object to the target pose for the object;
    based on the second orientation, determining a repositioning orientation in which to place the object on a support stand to reorient the object with respect to the robotic manipulator using the support stand, wherein the support stand is configured to receive the object placed thereon in a given orientation and maintain the given orientation of the object placed thereon;
    based on the repositioning orientation, determining a first orientation with respect to the robotic manipulator in which to pick up the object;
    causing the robotic manipulator to pick up the object in the first orientation and place the object on the support stand in the repositioning orientation; and causing the robotic manipulator to pick up the object, disposed on the support stand in the repositioning orientation, in the second orientation with respect to the robotic manipulator and, while the object is held in the second orientation with respect to the robotic manipulator, causing the robotic manipulator to move the object to the target pose.

\* \* \* \* \*